May 7, 1940.  J. T. LEWIS ET AL  2,200,130
DIRECTOR
Filed March 4, 1940   5 Sheets-Sheet 1

Inventors
John T. Lewis
Gervais W. Trichel
By
Attorneys

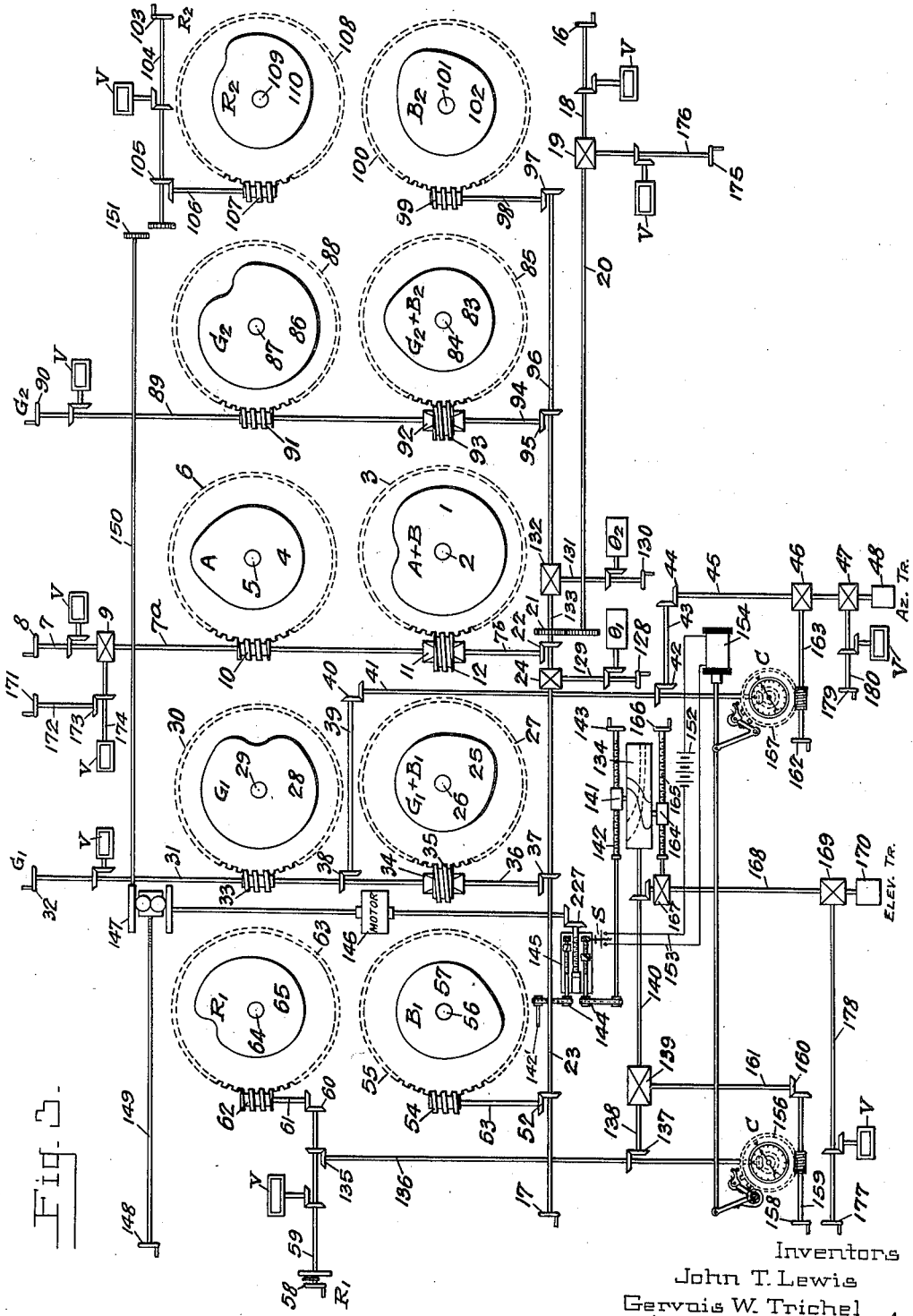

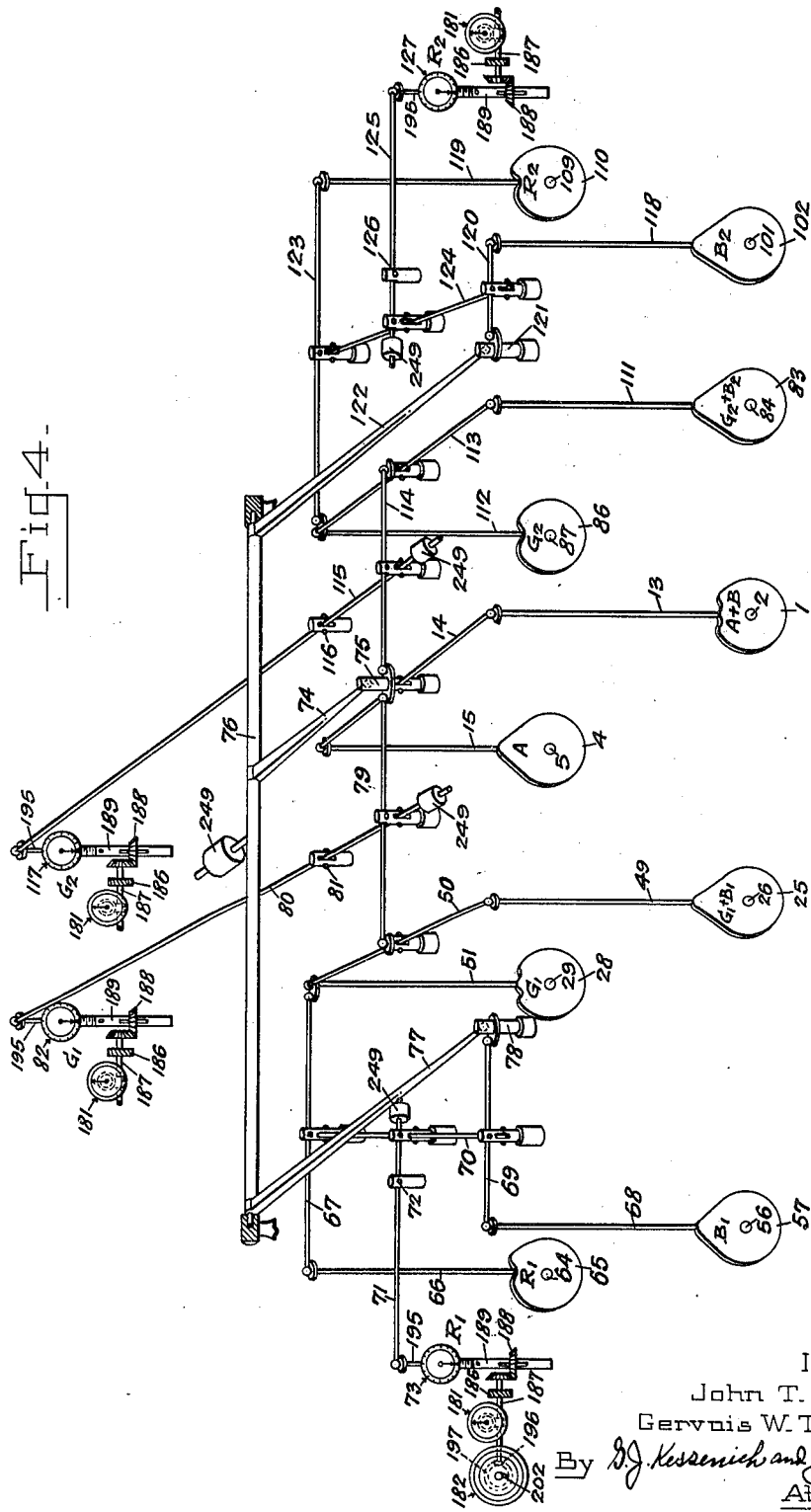

May 7, 1940.  J. T. LEWIS ET AL  2,200,130
DIRECTOR
Filed March 4, 1940  5 Sheets-Sheet 4
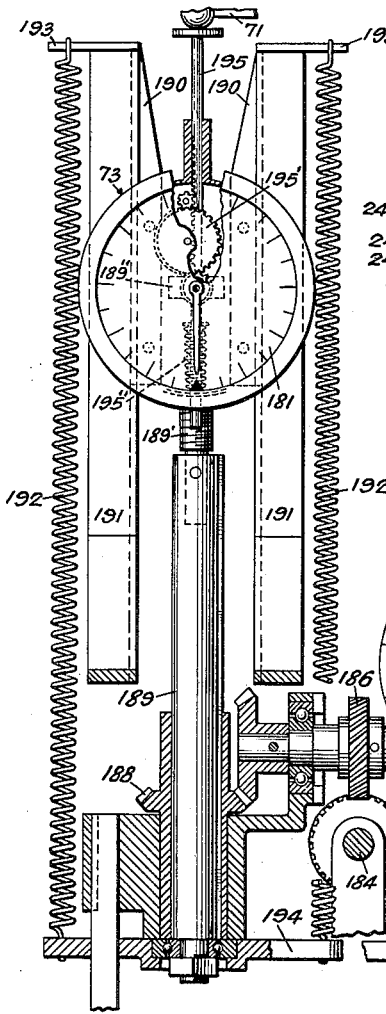
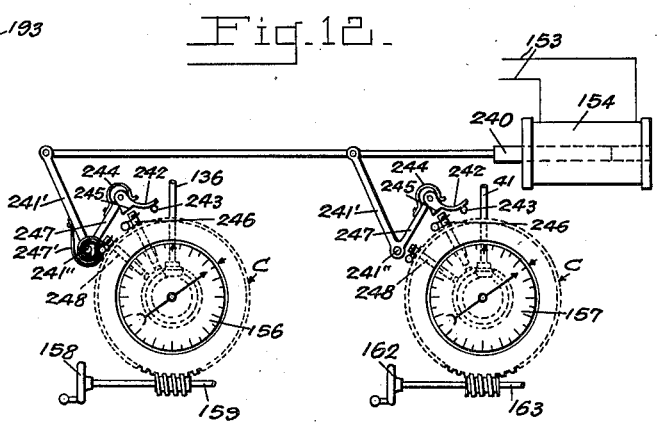
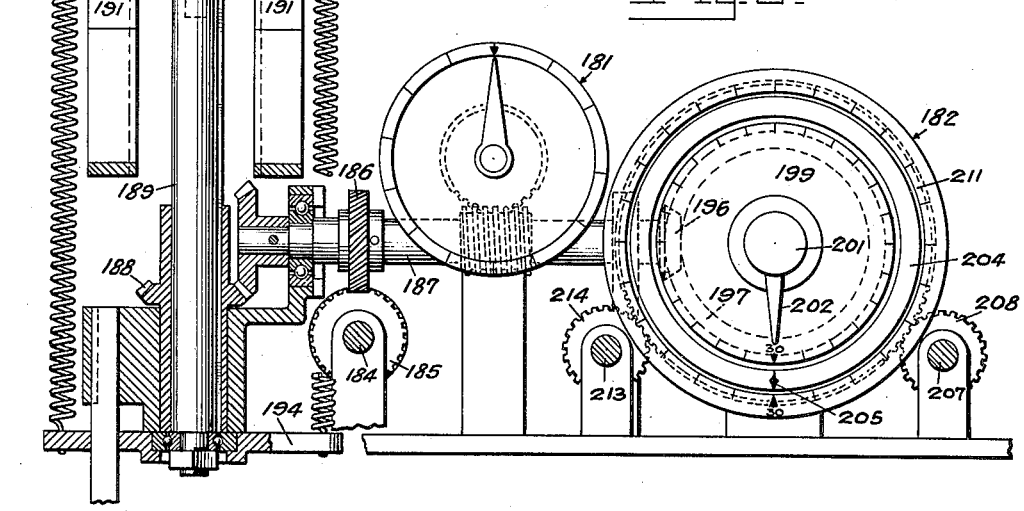
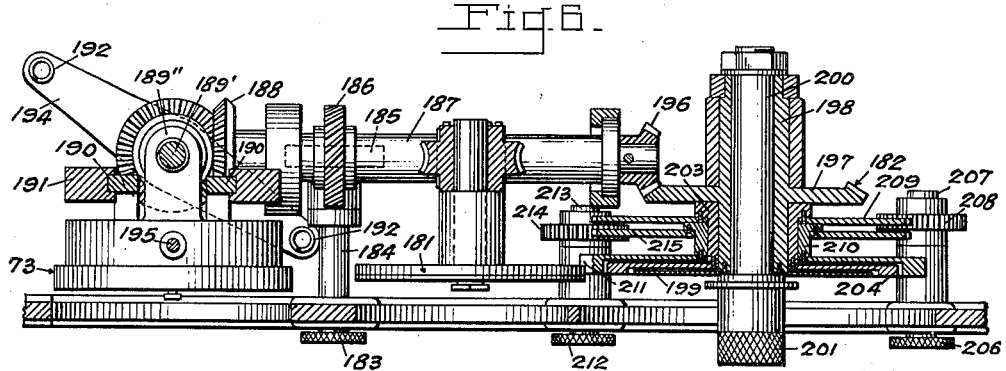
Inventors
John T. Lewis
Gervais W. Trichel
By Kessenich and Church
Attorneys May 7, 1940.  J. T. LEWIS ET AL  2,200,130
DIRECTOR
Filed March 4, 1940  5 Sheets-Sheet 5
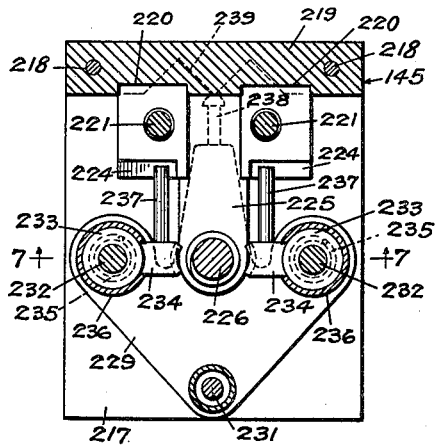
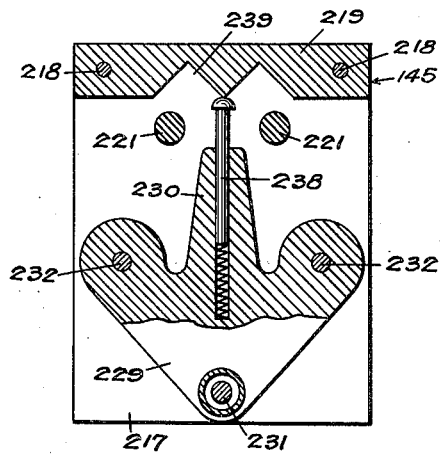
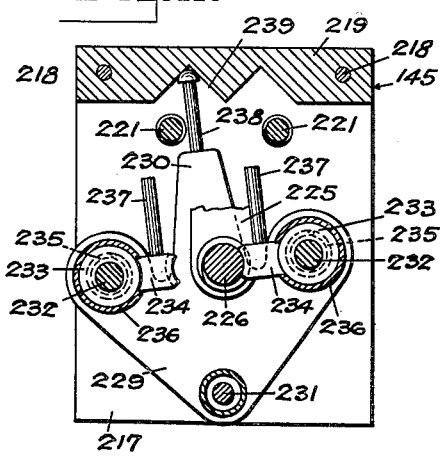
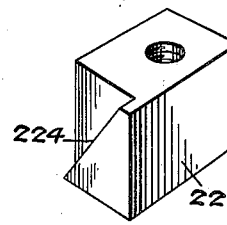
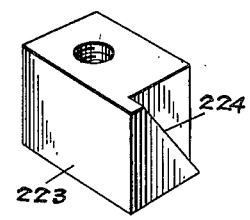
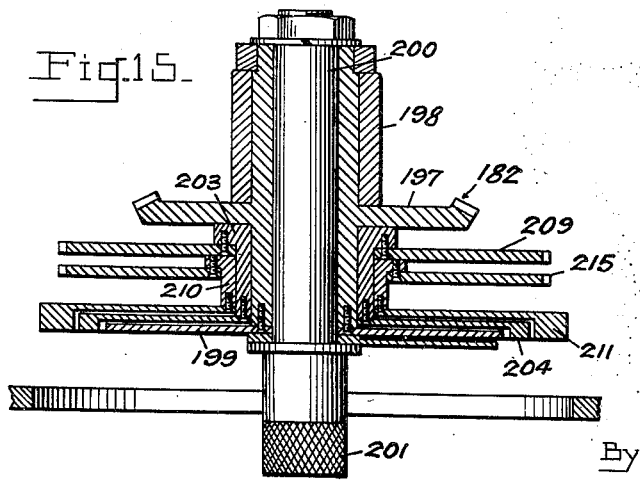
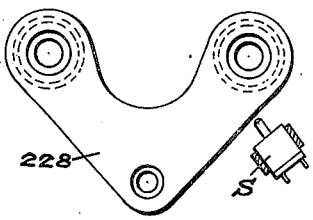
Inventors
John T. Lewis
Gervais W. Trichel
By *D.J. Kessenich and J.F. Church*
Attorneys Patented May 7, 1940

2,200,130

UNITED STATES PATENT OFFICE 2,200,130

DIRECTOR

John T. Lewis, United States Army, Rockford, Ill., and Gervais W. Trichel, United States Army, Philadelphia, Pa.

Application March 4, 1940, Serial No. 322,058

28 Claims. (Cl. 235—61.5)

(Granted under the act of March 3, 1883, as amended April 30, 1928; 370 O. G. 757)

The invention described herein may be manufactured and used by or for the Government for governmental purposes, without the payment to us of any royalty thereon.

This application is a continuation in part of our application Serial No. 137,590 filed April 17, 1937.

The subject of this invention is a director intended for use primarily in directing gun fire against a moving or stationary target.

The main objects of the invention are the provision of a director which, when the length of the base line and the base line angles are known, will find range and direction from directing points located outside the base line; which when, given range and direction from one station located at any point, will give range and direction from one directing point; which, when given course and speed of target and range and azimuth of target from directing point (which is the usual information received from an airplane observer), will give range and direction from a gun position; in which both angular travel and linear speed may be used to secure the desired data; in which the quadrant elevation for any given range is computed; and which may compute its own orientation data.

With the foregoing and such other objects in view as may hereinafter more fully appear, the invention resides in the novel arrangement and combination of parts and in the details of construction hereinafter described and claimed, it being understood, however, that changes may be made in the precise embodiment of the invention herein disclosed without departing from the spirit of the invention.

In the drawings accompanying this specification forming a part thereof.

Fig. 3 is a schematic view of the main portion of the device forming the subject of this invention.

Fig. 4 is a similar view of the cam lifting mechanism.

Fig. 5 is a view in elevation, partly in section of an indicator.

Fig. 6 is a plan view partly in section of the indicator.

Fig. 9 is a horizontal section on the line 9—9 of Fig. 8 showing the rocking frame in a neutral position.

Fig. 10 is a horizontal section on the line 10—10 of Fig. 8.

Fig. 11 is a horizontal section on the line 11—11 of Fig. 8.

Fig. 12 is a schematic view of the indicator arming and resetting mechanism controlled by the time interval mechanism.

Fig. 13 is a detail showing the left trip block in perspective.

Fig. 14 is a detail showing the right trip block in perspective.

Fig. 15 is a horizontal sectional view on enlarged scale of the battery commander's corrective register shown in Fig. 6.

Fig. 16 is a plan view of the upper member of the rocking frame.

MATHEMATICAL THEORY OF THE DEVICE

Figure 1:
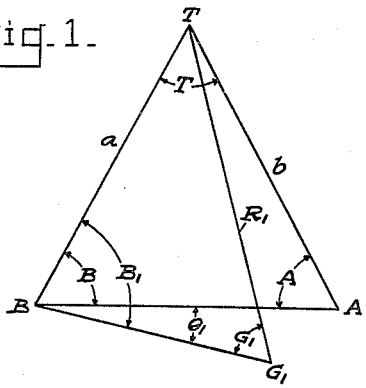
Fig. 1 is an illustration of the method of triangulation by which data is solved for a position outside a given base line.
Figure 2:
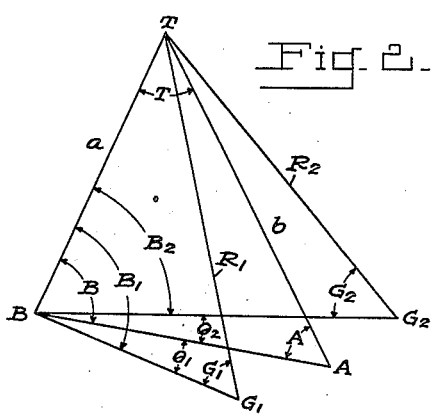
Fig. 2 is a similar illustration for two positions outside a base line.

In Figs. 1 and 2, A and B are base end stations, $G_1$ and $G_2$ gun positions, and T is the target.

In the following discussion, the elements of the triangles will be referred to as follows:

Angle TBA as B  
Angle TAB as A  
Angle $TBG_1$ as $B_1 = B + \theta_1$  
Angle $TG_1B$ as $G_1$  
Angle BTA as T  
Angle $ABG_1$ as $\theta_1$  
Angle $TBG_2$ as $B_2$  
Angle $TG_2B$ as $G_2$  
Angle $ABG_2$ as $\theta_2$ Side BT as $a$  
Side AT as $b$  
Side BA as BA  
Side $BG_1$ as $BG_1$  
Side $G_1T$ as $R_1$  
Side $BG_2$ as $BG_2$  
Side $G_2T$ as $R_2$ Of the above listed values BA, $BG_1$ and $\theta_1$, are constant for any particular base line and gun position.

Given: A, B, BA, $BG_1$ and $\theta_1$. Find the direction of T from $G_1$ or the angle $G_1$.

In the triangle BAT, from the sine formula, we have $$\frac{\sin A}{\sin T} = \frac{a}{BA} \quad (1)$$

$T = 180° - (A+B)$ $\sin T = \sin [180° - (A+B)] = \sin (A+B) \quad (2)$

Substituting (2) in (1) we have $$\frac{\sin A}{\sin (A+B)} = \frac{a}{BA} \quad (3)$$

or $$a = \frac{BA \sin A}{\sin (A+B)} \quad (4)$$

Expressing (4) in logarithms we have:

$\log a = \log BA + \log \sin A + \text{colog} \sin (A+B) \quad (5)$

Similarly, in triangle $BTG_1$, we have $$\frac{\sin G_1}{\sin (G_1+B_1)} = \frac{a}{BG_1} \quad (6)$$

Solving for $a$, and expressing in logarithms, we have $$\log a = \log BG_1 + \log \sin G_1 + \text{colog} \sin (G_1 + B_1) \quad (7)$$

Equating (5) and (7):

$$\text{Log } BA + \log \sin A + \text{colog} \sin (A+B) = \log BG_1 + \log \sin G_1 + \text{colog} \sin (G_1 + B_1)$$

Transposing terms we have $$\log \sin (A+B) + \text{colog} \sin A + \text{colog} \sin (G_1 + B_1) + \log \sin G_1 = \text{colog} \frac{BG_1}{BA} \quad (9)$$

$$\frac{BG_1}{BA}$$

(being the ratio of the fixed lines $BG_1$ and $BA$) is constant for any given location of base and stations (A and B) and gun position ($G_1$). Moreover, the ratio $$\frac{BG_1}{BA}$$

is known.

It follows, therefore, that if we have four two-dimensional cams, one for each of the four terms on the left side of Equation 9 above, the equation may be mechanically solved. For this purpose there would be employed a first cam which rotates with the angle $(A+B)$ and the lift from which equals $\log \sin (A+B)$; a second cam which rotates with the angle A, and the lift from which equals colog sin A; a third cam which rotates with the angle $(G_1+B_1)$ and the lift from which equals colog sin $(G_1+B_1)$; and a fourth cam which rotates with the angle $G_1$ and the lift from which equals $\log \sin G_1$. From Equation 9 the algebraic sum of the lifts of the four cams is equal to colog $$\frac{BG_1}{BA}$$

which as stated above, is constant for each base line set-up and which may be determined by providing an indicator having indices relatively displaceable in proportion to colog $$\frac{BG_1}{BA}$$

operable in response to the sum of the lifts of the cams whereby it will be known when the equation is balanced.

Equation 9 includes only one unknown; viz., $G_1$. It follows therefore, that if the constant value $\theta_1$ and values of A and B such that $a$ and $b$ intersect at point T, are set into an instrument, as outlined above, thereby completely positioning the first and second cams, and partially positioning the third cam, the third and fourth cams, as a unit may be varied until the resultant sum of the lifts of all four cams equals the known constant lift, colog $$\frac{BG_1}{BA}$$

When such a condition is brought about, the position of the fourth or $G_1$ cam indicates the angle $G_1$ or the direction of the target T from the gun position $G_1$.

It follows logically, from the above discussion that if (in addition to the constants) any two of the angles A, B or $G_1$ are known and set, the third angle may be found by varying the position of its cam until the sum of the lifts of all four cams equals the known value colog $$\frac{BG_1}{BA}$$

The angle $G_2$ may be determined by solution of the following equation derived in the same general manner as Equation 9:

$$\log \sin (A+B) + \text{colog} \sin A + \text{colog} \sin (G_2+B_2) + \log \sin G_2 = \text{colog} \frac{BG_2}{BA} \quad (9')$$

Inasmuch as the expressions $\log \sin (A+B)$ and colog sin A are common to both Equations 9 and 9' it is only necessary to provide two more cams and an indicator in the director to solve Equation 9', i. e., one cam for colog sin $(G_2+B_2)$, where $B_2 = B \pm \theta_2$ another cam for $\log \sin G_2$ and an indicator for colog $$\frac{BG_2}{BA}$$

The angle $G_2$ is determined by mechanical solution of Equation 9' in a manner very similar to that outlined in respect to the solution of Equation 9 for angle $G_1$.

To determine the distance of the target T from the station $G_1$ that is the range $R_1$, when given A, B, $\theta_1$, BA and $BG_1$.

In triangle $BG_1$ T $$\frac{\sin G_1}{\sin B_1} = \frac{a}{R_1} \quad (10)$$

and $$R_1 = \frac{a \sin B_1}{\sin G_1} \quad (11)$$

Expressing (11) in logarithms $$\text{Log } R_1 = \log a + \log \sin B_1 + \text{colog} \sin G_1 \quad (12)$$

and $$\text{Log } R_1 + \text{colog} \sin B_1 + \log \sin G_1 = \log a \quad (13)$$

From Equation 5

$$\text{Log } \sin (A+B) + \text{colog} \sin A + \log a = \log BA \quad (14)$$

Substituting for $\log a$ in (14) its value as expressed in (13) we get.

$$\text{Log } \sin (A+B) + \text{colog} \sin A + \log \sin G_1 + \text{colog} \sin B_1 + \log R_1 = \log BA \quad (15)$$

The five terms on the left of Equation 15 are each represented by a cam. The first, second, and third terms are represented by the first, second and fourth cams hereinbefore referred to, while the fourth and fifth terms are represented by a fifth and sixth cam, the former of which rotates with angle $B_1$ and its lift is the colog sin $B_1$, and the latter of which rotates with $R_1$ and its lift is $\log R_1$.

The sum of the lifts of the first, second, fourth, fifth and sixth cams is equal to log BA, Equation 15.

BA, the base line, is constant for any particular set-up, and its length is known.

Equation 15 contains initially two unknowns; viz. $G_1$ and $R_1$, but $G_1$ is determined as explained hereinbefore, leaving only $R_1$ to be determined. This is done mechanically in a manner similar to that described for obtaining $G_1$. The constants are first set into the director. Values of A and B are then set in and $G_1$ is solved for as previously described. The $R_1$ cam is then varied until the algebraic lift of all five cams effecting range is equal to log BA, at which time the position of the $R_1$ cam indicates the range $R_1$.

The range $R_2$ from a second gun or other position, as from position $G_2$, may be determined by solution of the following equation derived in the same general manner as Equation 15:

$$\text{Log } \sin (A+B) + \text{colog} \sin A + \log \sin G_2 + \text{colog} \sin B_2 + \log R_2 = \log BA \quad (15')$$

From inspection it may be seen that all terms of the left side of this equation except colog sin $B_2$ and log $R_2$ are common with terms of Equation 9'. It is, therefore, only necessary to provide the director with a cam for each of these values and an indicator for the value log BA to enable mechanical solution of the equation by the director. Solution of Equation 15' is generally similar to Equation 15.

The director comprises (see Fig. 3), mechanism for introducing values of the base end angles A and B through means of a cam 1, formed to introduce values log sin $(A + B)$ mounted on a shaft 2 on which is also mounted a worm wheel 3; and a cam 4 formed to introduce values colog sin A, which cam is fast on a shaft 5 on which is also mounted a worm wheel 6. It is to be understood that all shafts are journaled in suitable supports, not shown. A shaft 7, driven by means of a hand wheel 8, drives through a differential 9, a shaft 7$^a$ carrying a worm 10 meshing with the worm wheel 6 and, through a differential 11 and worm 12, the worm wheel 3 and cam 1.

The cam 1 is contacted by a follower 13, (Fig. 4), the lift of which is controlled by said cam and the upper end of this follower contacts one end, preferably globular, of a cross arm or lever 14, the other end of which contacts the upper end of a follower 15 which contacts, and the lift of which is controlled by the cam 4.

The base angle B, when known, is introduced into the director through means of the handwheel 16 (Fig. 3) which drives, by shaft 18, differential 19, shaft 20, gearing 21, 22, a shaft 7$^b$, and one element of the differential 11 through the cam 1 to add angle B to angle A. Angle B is also at this time, impressed on cams 25, 57, 83 and 102 as hereinafter described through gearing 21 which drives shafts 23 and 96. When the value of angle B is unknown, it may be determined from other known data. To facilitate organization of the director, handwheel 17 is provided to impress angle B on cams 1, 25, 57, 83 and 102, through shaft 23 and differential 24 when this angle is unknown and being solved, as the operator may then be in position to view the proper indicator to ascertain when a balance of the lifts of the cams is obtained and angle B determined.

Mechanism for introducing values of the angle at the gun position, that is, the angle between a line drawn from the gun position to the target and a line drawn from the gun position to the far end of the base line (herein termed $G_1$), is provided through means of a cam 25 (Fig. 3) designed to introduce values colog sin $(G_1 + B_1)$ which is fast on a shaft 26 on which is also mounted a worm wheel 27; and also through a cam 28, designed to introduce values log sin $G_1$, which cam is fast on a shaft 29 on which is mounted a worm wheel 30. The worm wheels 27 and 30, and with them their associated shafts and cams, are rotated through means of a shaft 31, provided with a hand wheel 32, on which shaft is a worm 33 meshing with the worm wheel 30 and an element of a differential 34, another element of which is a worm 35 meshing with the worm wheel 27 and still another element of which is mounted on a shaft 36. Gearing 37 connects the shafts 36 and 23 so that movement of the hand wheel 17 imparts movement to the worm 35 and through worm wheel 27 and shaft 26 to the cam 25. Rotation of the shaft 31 through manipulation of the hand wheel 32 causes, through gearing 38, rotation of shaft 39 which, through gearing 40 rotates shaft 41 and the rounds counter C coacting with the azimuth prediction indicator 157, which conditions the rounds counter to rotate the needle of the indicator as hereinafter described. Rotation of shaft 41 also through gearing 42, shaft 43 and gearing 44 imparts movement to shaft 45, differentials 46 and 47, and to azimuth transmitter 48.

A follower 49 (Fig. 4), engages the cam 25 and its upper end contacts one end, preferably globular, of a lever 50, the other end of which is contacted by a follower 51 engaging the cam 28.

Values of the angle B, when the value of angle B is unknown, are introduced through the hand wheel 17 (Fig. 3) which, through shaft 23 and gearing 52 drives shaft 53 on which is secured worm 54 meshing with worm wheel 55 fast on shaft 56 on which shaft is also mounted cam 57, it being understood that angle $\theta_1$ has been previously impressed upon cam 57. Shaft 23 is geared through gearing 21 to shaft 20 so that movement of handwheel 17 drives shaft 20, differential 19 and shaft 18; consequently, by rotating shaft 23 through handwheel 17 to bring the $R_1$ pointer to normal, angle B is solved and its value may be read on the counter geared to shaft 18 as further herein made apparent.

Values of range are introduced through handwheel 58 (Fig. 3), driving shaft 59, which, through gearing 60, shaft 61, worm 62 fast on shaft 61, worm wheel 63 meshing worm 62 and shaft 64 drives cam 65.

Contacting cam 65 (Fig. 4) is a follower 66 the upper end of which engages one end of a lever 67 the other end of which lever is engaged by the follower 51 actuated by cam 28.

A follower 68 contacts cam 57 and its upper end engages one end of a lever 69 the other end of which lever is actuated by an arm 77 of a rocker bar 76 hereinafter described. Between the levers 67 and 69 is mounted a connecting bar or lever 70, a median point of which lever engages one end of a lever 71 fulcrumed at 72, the other end of this lever is in operative engagement with a range indicator 73 from which indicator it may be determined when the lifts of the cams are equal to or will balance the quantity log BA by observing when the lifts of the cams return the indicator needle to its normal position from a predetermined displacement from its normal position proportional to log BA. When the needle or pointer is returned to its position of normal zero displacement or the indices of the indicator otherwise suitably matched, the indicator indicates a proper balance between the lifts of the cams and the predetermined displacement of the indicator indices initially set.

It will further be evident that displacement of the lever 14 by the followers 13 and 15 (Fig. 4) will cause displacement of one end of an arm 74 through means of the sliding fulcrum 75 of the lever 14. The arm 74 is fast on a rocker bar 76 from which extends the hereinbefore mentioned arm 77, the free end of which is adapted to move a slide 78 to rock the end of the lever 69 not contacted by the follower 68, thus causing additional angular displacement of the lever 70 which, through the lever 71, is transmitted to the $R_1$ indicator 73 to impress values of angles A and B thereon and add the lifts of these cams to the lifts of the other cams acting to effect coincidence of the $R_1$ indicator indices.

Extending between a median point on the lever 50 and the slidable fulcrum 75 is a bar 79 which is engaged medially by one end of a lever 80, fulcrumed at 81, the other end of which lever engages the operative plunger of a $G_1$ indicator 82 from which indicator may be determined when the lifts of the cams acting on this indicator are equal to or balanced by a predetermined displacement of the indicator needle or the indicator through observing when the indicator needle is returned to its normal zero position of displacement by the lifts of the cams. When the indicator needle of the $G_1$ indicator 82 is on normal or the indices in coincidence which indicates that the lifts of the cams is equal to or balances a predetermined displacement of the indicator needle the position of the $G_1$ cam indicates the angle $G_1$.

To enable the device to solve the problem, and indicate the data necessary for another station or position, cams equivalent to cams 25, 28, 57 and 65 are provided as follows:

A cam 83 (Fig. 3) (colog sin $G_2 + B_2$) is fast on a shaft 84 upon which is also mounted a worm wheel 85, and a cam 86 (log sin $G_2$) is fast on a shaft 87 on which is also mounted a worm wheel 88. A shaft 89 driven through a handwheel 90 carries a worm 91 meshing with the worm wheel 88 and also has mounted thereon an element of a differential 92 through which is driven a worm 93 meshing with the worm wheel 85 and another element of the differential is mounted on a shaft 94 which shaft is geared through gearing 95 to a shaft 96. The shaft 96 is geared through the gearing 97 to shaft 98 on which is a worm 99 meshing with a worm wheel 100 fast on a shaft 101 on which is mounted a cam 102 (colog sin $B_2$).

Range $R_2$ in this instance is introduced by means of a handwheel 103 (Fig. 3) on a shaft 104 geared through gearing 105 to a shaft 106 on which is mounted a worm 107 meshing with a worm wheel 108 fast on a shaft 109 on which is mounted a cam (log $R_2$) 110.

The cams 83 and 86 are engaged by their respective followers 111 and 112 (Fig. 4), the upper ends of which engage respective ends of a lever 113 which is engaged medially by one end of a lever 114 the other end of which engages the slide 75. The middle of the lever 114 is engaged by one end of a lever 115 fulcrumed at 116 and the other end of this lever engages the plunger of a $G_2$ indicator 117 from which indicator may be determined when the lifts of the cams are equal to $$\operatorname{colog} \frac{BG_2}{BA}$$

by observing when the indicator needle is returned to its normal position of zero displacement by the lifts of the cams from a predetermined displacement from its normal position proportional to $$\operatorname{colog} \frac{BG_2}{BA}$$

When the needle is on normal, indicating a proper balance, the position of the $G_2$ cam indicates the angle $G_2$.

The cams 102 and 110 (Fig. 4) are engaged by their respective followers 118 and 119, the upper end of the former of which engages one end of a lever 120 the other end of which lever is actuated by a slide 121 moved by the free end of an arm 122 of the rocker bar 76 and the upper end of the latter of which engages one end of a lever 123 the other end of which lever is moved by the follower 112. Extending between the levers 120 and 123 is a connecting bar 124, the middle point of which engages one end of a lever 125 fulcrumed at 126, the other end of which lever engages the plunger of a range $R_2$ indicator 127 from which indicator it may be determined when a proper balance of the lifts is had by observing when its needle is brought to a position of normal displacement from a predetermined position of displacement proportional to log BA. When the needle is on normal, indicating a proper balance, the position of the $R_2$ cam indicates the range $R_2$.

To introduce the value of $G_1$ offset angle viz. $\theta_1$ (Fig. 3) a handwheel 128 is provided through which a shaft 129 is rotated to add algebraically this value to angle B on cams 25 and 57 through the differential 24, shaft 23 and shaft 36, differential 35 and shaft 53, respectively. The value of $G_2$ offset angle viz. $\theta_2$ is introduced through handwheel 130 driving shaft 131 to add this value algebraically to angle B on cams 83 and 102 through differential 132, one element of which is mounted on shaft 96 while another element drives through shaft 133 and the associated gearing interconnecting shaft 96 and the cams 83, 102.

A range drum 134 is provided and is initially driven through the handwheel 58, driving shaft 59, gearing 135, shaft 136, gearing 137, shaft 138, differential 139 and shaft 140. The shaft 136 also drives the rounds counter C in back of the range prediction indicator 156 as will be set forth subsequently. The rounds counter C is substantially identical in construction to the rounds counter C in back of the azimuth prediction indicator 157. The range drum is provided with the necessary sets of curves, and has associated therewith pointers one of which 141 is a time pointer moved longitudinally of the drum by a screw shaft 142 upon which it is mounted, which shaft 142 is conveniently rotated by a handwheel 143. The screw shaft is geared through gearing 144 such as the sprocket and chain shown to a time interval device 145, in this instance a mechanically operated time switch which makes and breaks an electrical circuit at predetermined intervals. The timing members of the switch are driven by a constant speed electric motor 146 which also drives a variable speed mechanism 147. The speed of the output element of the speed mechanism 147 is controlled through a range rate handwheel 148 which in this instance, through the screw shaft 149, moves the ball cage of the mechanism toward or away from the center of the rotating disk driven at constant speed by the motor 146. The output element of the speed mechanism 147 drives a shaft 150 which may be thrown in gear through gearing 151 with the shaft 104 to vary the position of the cam 110.

The time interval device when thrown to close the circuit, causes current to flow from the battery 152, (Fig. 3) through circuit 153 and solenoid 154 to control the displacement of the needles registering on the prediction indicator disks 156 and 157 respectively, by the rounds or revolution counters C in back of the disks, the former of which indicates range prediction which is set into the instrument, by matching the pointer, through handwheel 158, shaft 159, gearing 160, shaft 161 and differential 139; while the latter registers azimuth prediction which is introduced into the instrument, by matching the pointer through handwheel 162, shaft 163, differential 46, to the azimuth transmitter 48.

The solenoid 154, when energized, releases locking levers which normally lock the rounds counters in rear of the indicator disks 156 and 157, against movement and also during unlocking movement and prior to unlocking resets such counters in the manner hereafter set forth.

The elevation difference pointer 164 is moved longitudinally of the range drum 134 by the screw shaft 165 rotated through handwheel 166. The screw shaft 165 drives differential 167 and through the differential a shaft 168 driving an element of a differential 169 through which is driven an elevation transmitter 170.

When the spotting method of fire control is employed corrections are introduced by a handwheel 171 to drive shaft 172 which, through gearing 173 drives shaft 174, driving an element of differential 9, thus introducing necessary changes in the angle A. To introduce changes in the angle B made necessary by the information furnished by the B spotter, a handwheel 175 is made use of for driving a shaft 176 and through it the differential 19.

Changes in elevation due to spotting information are made through handwheel 177 which drives a shaft 178 and through it differential 169. Changes in azimuth due to such information are introduced through handwheel 179 driving shaft 180 and through differential 47 the azimuth transmitter 48 which is also driven through differential 46.

It will be noted that counters or registers V (Fig. 3) are geared to the operative shafts and register the revolutions thereof. The device is so designed that each turn of a shaft giving angular measurement represents a given number of mils, in this case for convenience 10 mils, so that the angular displacement of these shafts may be read directly from the counters V. In the case of the shafts controlling range data, each turn of the shafts represents a given number of yards of range which may be read directly from their counters V.

THE INDICATORS

Each of the indicators 73, 82, 117 and 127, of which the R₁ indicator is shown in Figs. 5 and 6, has associated therewith a dial 181 for registering known values, viz: the base line length; or the ratio between the length of the base line and the length of a line drawn from a station under consideration to the far end of the base line, and, in the case of the R₁ indicator 73 and also R₂ indicator 127 if desired has also associated therewith a register 182 for registering battery commander's corrections. Each dial 181 is set through means of a knob 183 on a shaft 184 on which shaft is a reversible gear wheel 185 meshing with a gear 186 on a shaft 187. The shaft 187 associated with each of the indicators is operable by means of the setting knob 183 connected thereto for rotating the shaft 189 through the gearing 188. A shaft 189' rigidly secured to the shaft 189 for rotation therewith is disposed in interthreaded relation with a lug 189" secured to the indicator as shown in Figs. 5 and 6 and as the indicator is non-rotatably and slidably mounted in the supporting frame 191 through the guides 190 secured thereon, as will appear hereinbelow, it will be seen that rotation of shafts 189 and 189' will bodily translate or slide the indicator in the supporting frame because of the relative screw or thread motion between the shaft 189' and 189" secured on the indicator. As more particularly disclosed in Fig. 5, each indicator is provided with a plunger 195 adapted through suitable gearing generally indicated at 195' to displace the pointer from its normal position relative to the indicator upon relative movement with respect to the indicator as is well understood in the art. By this arrangement it will be clear that when the cams are in their position of zero displacement and the indicators arranged with their pointers or indices zeroized that the levers 71, 80, 115 and 125 in engagement with the plungers 195 of the respective indicators 73, 82, 117 and 127, with which they coact, will restrain movement of the plungers 195 upon bodily sliding movement or translation of the indicators relative to the levers and that relative movement of the indicators with respect to the plungers 195 thereof will displace the indicator pointers or indices accordingly. Similarly if the indicators are restrained from movement with the needles of the indicators at their zero positions and the cams arranged with a zero lift, movement of the cams from said zero lift position will move the levers 71, 80, 115 and 125 and therethrough the associated plungers 195 relative to the indicator bodies or casings to displace the needles of the indicators accordingly. Combined movements of the indicator bodies and their respective levers 71, 80, 115 and 125 will move the plungers 195 of the indicators the algebraic sum of such combined movements to position the indicator needles accordingly. A spring 195" is interposed between the indicator body and plunger 195 initially compressed to urge the plunger 195 to its upper extremity in which position the needles of the indicators are in positions of zero displacement. All movements of the indicator pointers or indices are of course effected by relative movements of the indicators with respect to the plungers 195.

To assure that the indicators operated upon by the plungers 195 will not be injured even though some one should attempt to work out a problem beyond the capacity of the device, they are so mounted as to yield under such circumstances. To the foregoing end each indicator is provided with tongues 190, fitting in grooves in the supporting frame 191 attached to the housing for the director and is held in its upper normal position by springs 192 connected to arms 193 secured to the supporting frame as shown. A yoke 194 in which the lower end of the shaft 189 is journaled is suspended from the springs 192, so that, when the plunger 195 of an indicator has been depressed to its full extent, the springs will yield and allow the indicator yoke 194 and shaft 189 which is splined to the member of gearing 188 attached thereto for vertical sliding movement to move downwardly.

In the case of the R₁ and R₂ indicators 73 and 127 (Figs. 5, 6 and 15) the shaft 187 terminates at its end remote from gearing 188 in a bevel gear 196 which meshes with a bevel gear 197 carried on a sleeve 198 on which is mounted a graduated dial 199 of a battery commander's correction register. Through the sleeve 198 extends a shaft 200 on the outer end of which is a knob 201 and a pointer 202 for setting off ballistic corrections. Journaled on the sleeve 198 is a short sleeve 203 on which is carried a dial 204 having engraved thereon a reference mark 205. The sleeve 203 and its dial 204 are rotated through means of a knob 206 mounted on the outer end of a stub shaft 207 carrying a pinion 208 which meshes with a spur gear 209 fast on the sleeve 203.

Journaled on the sleeve 203 is another short sleeve 210 having mounted thereon a dial 211 having graduations engraved thereon. The sleeve 210 with its dial 211 is rotated by means of a knob 212 on the outer end of a stub shaft 213 carrying a pinion 214 which meshes with a spur gear 215 fast on the sleeve 210.

From the foregoing it will be evident that movement of knob 183 to move shaft 187 and the pointer associated with dial 181 will bodily move the indicator 73 accordingly which will relatively displace the indicator with respect to the plunger 195 and thereby move the pointer of the indicator with respect to the indicator dial through the gearing 195', consequently when the pointers of the dials 181 for the $R_1$ and $R_2$ indicators 73 and 127 are set to the baseline length BA the pointers on the indicators 73 and 127 will likewise be displaced with respect to their normal zero indices an amount proportional to the length of base line BA. Likewise when the pointers of the dials 181 associated with the $G_1$ and $G_2$ indicators 82 and 117 are set to the base line ratios $$\frac{BG_1}{BA} \text{ and } \frac{BG_2}{BA}$$

the pointers on the indicators 82 and 117 will similarly be displaced with respect to their normal zero indices an amount proportional to the base line ratios used with these indicators respectively. In the case of the $R_1$ and $R_2$ indicators which are provided with the battery commander's arbitrary correction register as above described and which registers are used to register arbitrary corrections made as a percentage of the base line AB, it will be seen that movement of shaft 187 moves the graduated dial 199 so that the data set on dial 181 will also position the normal zero index of dial 199, herein shown as 30, arbitrarily so selected as to avoid the use of negative numbers, to a position corresponding to the data set on dial 181; therefore, before the register 182 can function as a register it must be zeroized which is done by bringing the index 205 on dial 204, the zero index of dial 211, which is index number (30), and the pointer 202 into coincidence with the zero index number (30) of dial 199 by their knobs 206, 212, and 201, respectively. The register is now zeroized and conditioned to serve as an indicator for setting arbitrary corrections into the director and for registering the total value of the arbitrary corrections set in. When it is desired to set an arbitrary correction in the director the pointer 202 is moved from the zeroized position over the graduations on dial 199 to a position corresponding with the correction desired which corresponds to the magnitude of the correction to be made on the setting of the base line AB. After the pointer 202 is set to the correction the dial 211 is moved until its zero index 30 will coincide with the pointer 202 and through which expedient the value of the correction may be read on the dial 211 against the index 205. The correction is now actually set in the director by moving knob 183 until the zero index 30 of dial 199 coincides with pointer 202. While movement of dial 199 with respect to pointer 202 destroyed registration of the correction set in the director it will be obvious of course that registration of the correction is maintained on dial 211 with respect to index 205. Further corrections may be made in the same manner and registration of all corrections will be effected on dial 211.

THE TIME INTERVAL DEVICE

Any suitable and well known time interval device may be used, the specific construction of such device forming no part of the present invention.

The time interval device 145 as herein shown (Figs. 3 and 7 to 11) comprises an upper plate 216 and a lower plate 217 secured as by screws 218 to a front plate 219 provided with a pair of spaced longitudinal grooves 220—220 on its inner face. Journaled in the upper and lower plates are screw shafts 221—221, the ends of which project below the lower plate and have mounted on the projecting ends sprockets 144. Mounted on the threaded shafts 221—221 are blocks 223—223 which are bored and tapped to engage the threads of the shafts.

Figure 7:
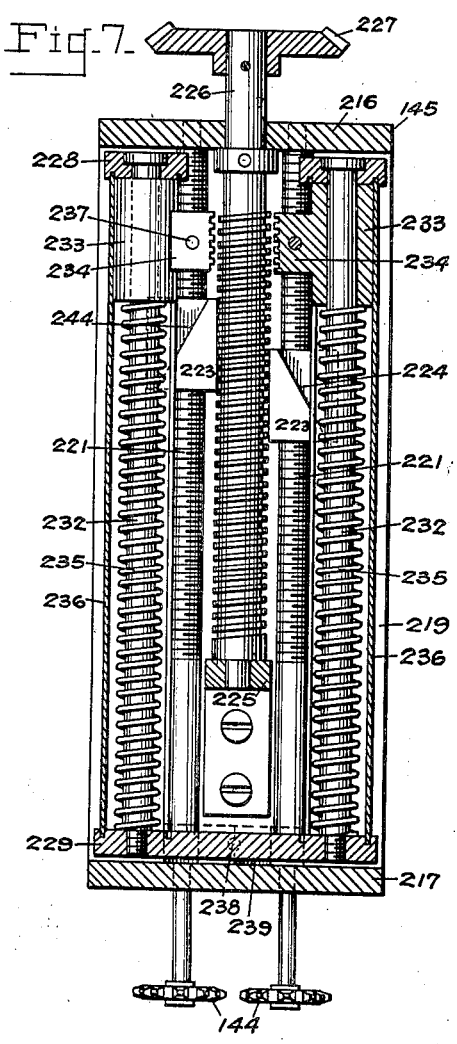
Fig. 7 is a longitudinal sectional view on the line 7—7 of Fig. 9, of the time interval device.
Figure 8:
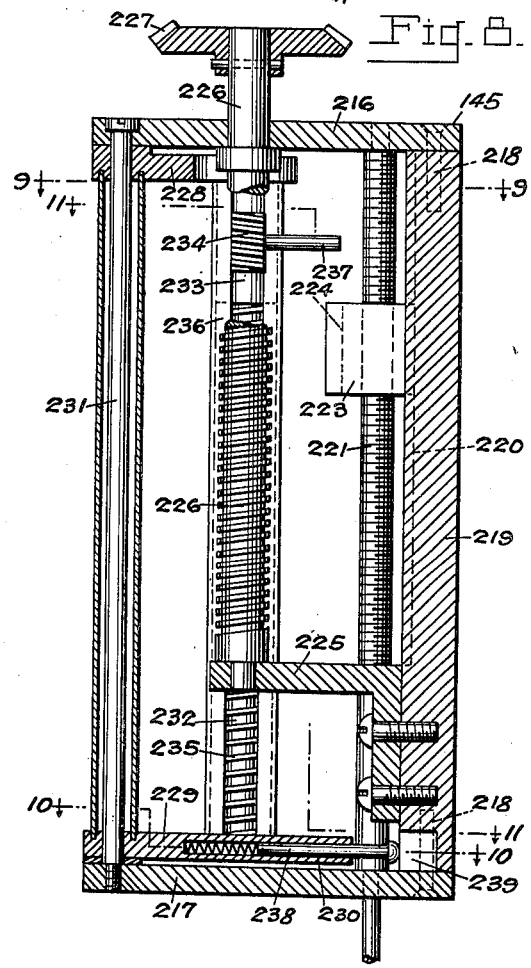
Fig. 8 is a similar view taken at right angles to Fig. 7.

Each block 223 has its face opposite the groove 220 in which it slides cut away to provide a portion presenting a downwardly and outwardly inclined face 224, as seen in Fig. 7. The outer portion of the blocks ride in the grooves 220 to hold the blocks against rotation with the shafts.

Journaled in the upper plate 216 and a bracket 225 is a threaded shaft 226 situated substantially centrally of the device and having its upper end projecting above the upper plate to receive a bevel gear 227.

Pivotally mounted between the upper and lower plates is a rocking frame comprising upper and lower end members 228 and 229 respectively, the upper member 228 being of roughly triangular form with an arcuate portion removed from one side thereof to straddle the screw shaft 226. The lower member 229 is of a form similar to the upper member with the exception that extending from the center of what would be the arcuate portion of the upper member there is a projection 230 provided with a socket for a purpose hereinafter set forth. The rocking frame is conveniently pivoted on a shaft 231 anchored in the upper and lower plates 216 and 217. At forward corners of the frame, and extending from the upper to the lower end members are rods 232—232 upon which are slidably mounted sleeves 233—233 each formed with a radially extending arm 234 in the free end of which threads are cut to mesh with the threads on the screw shaft 226. Also surrounding the rods are coiled springs 235—235 confined between the respective sleeves 233 and the lower end member 229 of the rocking frame, the springs, rods and sleeves may be conveniently housed in slotted tubes 236—236, the slots being provided to accommodate the arms 234. Each arm 234 has extending therefrom a wiper finger 237 adapted to engage the inclined portion 224 of its block 223 to cause the rocking frame to be rocked in one direction or the other thus disengaging the threads of one arm 234 from the screw shaft 226 and engaging the threads of the other.

Rocking of the frame is aided through means of a spring pressed plunger 238 protruding from the socket in the projection 230 and engageable in one of the notches 239 formed in the front plate 219 laterally on either side of the longitudinal center line of the latter. Rocking the frame makes and breaks an electric circuit in any usual and well known manner.

As disclosed in Fig. 12, which is a view of the range in azimuth prediction indicators with the indicator needles displaced and the arming device in its inoperative position, it will be observed that when the time interval device 145 closes the circuit 153 by means of switch S that solenoid 154 will be energized and draw the armature 240 to the right as viewed in this figure. Movement of the armature 240 and connecting rod carried thereby will pivot the bell crank levers 241' in a clockwise direction about the pivots 241'' and urge the lever arms 247 in clockwise direction. Clockwise movement of the levers 247 will cause the fingers 242 which ride upon studs 243 fixed on any suitable support to be flexed against the action of springs 244. As the fingers 242 are flexed the heels 245 thereof will engage the reset plungers 246 and depress them through which action the needles of the indicators are unarmed or released from their displaced position and returned to their normal position of zero displacement as is well known in the art an example being the disclosure of U. S. Patent No. 1,836,178 wherein element 3 corresponds to the plungers 246 of this case and shaft 2 to the shafts 41 or 136. This patent does not show the reset plunger 248, but such feature is common as shown in U. S. Patent 450,966 at $b$ or $c$. Further movement of the armature to the right as viewed in Fig. 12 will cause the lever arms 247 to engage the arming plungers 248 and depress them thereby connecting the indicator needles to the rounds counters. The solenoid will hold the arming plungers 248 in depressed position so long as the solenoid is energized, which is for a period proportionate to the time of flight and the rounds counters which are driven by the range and azimuth shafts 136 and 41, respectively, and connected to the prediction indicator needles during this period will displace the needles accordingly. When the solenoid is de-energized it will return to the position of Fig. 12 through the action of spring 247' whereupon it will repeat the above described cycle upon re-energization in a manner hereinafter fully described. The structure of the counters C and the action of the reset and arming plungers to effect coupled driving and uncoupled connection between the counters and indicator needles has been omitted for the sake of clarity as such structure per se is well known in the art.

While a single solenoid has been shown for operating the reset and arming plungers of both prediction indicators 156 and 157 it will of course be obvious that one solenoid may be used for each of the indicators if desired.

To increase the ease of operation of the parts and reduce wear on the instrument, operative levers have been counterbalanced preferably by means of adjustable weights 249.

The operation of the device is as follows:

METHOD I.—*Two station horizontal base*

When the length of a base line such as AB, Figs. 1 and 2, and the base line angles A and B between the base line AB and target T are known, this method of operation of the director may be employed to solve Equations 9 and/or 9' and 15 and/or 15' for the purpose of determining the range $R_1$ and/or $R_2$ and direction $G_1$ and/or $G_2$ from directing points not located on the base line AB, as for example, points $G_1$ and/or $G_2$ shown in Figs. 1 and 2, but which are relatively located with respect to the base line so that the distances $BG_1$ and $BG_2$ are known.

In the solution of the above equations it is first necessary to orient the director which is done as follows: the length of the base line AB is set on the $R_1$ indicator 73 and $R_2$ indicator 127 by means of knobs such as the knob 183, Fig. 6, and other mechanism controlling the dials 181 associated with each of the indicators 73, 127. Likewise the ratios $$\frac{BG_1}{BA} \text{ and } \frac{BG_2}{BA}$$

are set on the $G_1$ indicator 82 and $G_2$ indicator 117, respectively, through the knobs 183 and other mechanism controlling the dials 181 associated with each of these indicators. Finally angle ($\theta_1$) known as the $G_1$ offset angle is set on cams 25 and 57 through handwheel 128 and angle ($\theta_2$) known as the $G_2$ offset angle is set on cams 83 and 102 through handwheel 130 to complete orientation.

It will be observed that in the orientation of the director the needles on the $G_1$ indicator 82, $G_2$ indicator 117, $R_1$ indicator 73 and $R_2$ indicator 127 have been displaced an amount equal to or proportional to the values occurring on the right sides of Equations 9, 9', 15 and 15', respectively, and that these values may now be equated by displacing the proper cams in such manner that the algebraic sum of their lifts is equal to the values on the indicators, which is conveniently ascertained in the present director by causing the resultant lifts of the proper cams to bring the indicator needles back to their normal or zero displacement settings. It will also be observed that the $G_1$ and $G_2$ offset angles ($\theta_1$) and ($\theta_2$), respectively, are constant for a given situation and algebraically considered with angle B in determining angles $B_1$ and $B_2$, respectively, and that the values of these angles have been impressed upon cams 25, 57 and 83, 102 respectively, with the proper sign (negative or positive) in the orientation of the director whereby upon subsequent impression of the angle B on these same cams the algebraic value through which the cams will have been angularly displaced will be equal to or proportional to the angle $B_1$ or $B_2$, respectively.

With the director now oriented it is adapted to solve any or all of Equations 9, 9', 15, 15', therefore, for the purpose of illustration let it be assumed that the range $R_1$ and direction $G_1$ of target T from directing points $G_1$ is desired, which requires solution of Equations 9 and 15. Angle A is impressed upon cams 1 and 4 by handwheel 8, shafts 7, 7a, worm 10, differential 11 and worm 12 which rotates these cams through angle A as determined by the counter V associated with shaft 7 and angle B is impressed on cams 1, 25 and 57 through rotation of the latter by handwheel 16, shaft 18, differential 19, shaft 20, gearing 21, 22, shaft 7b, differential 11, worm 12; shaft 23, gearing 37, shaft 36, differential 34, worm 35; and, gearing 52, shaft 53, worm 54, respectively, as determined by the counter V associated with shaft 18 and in such direction as to add angle B to angle A on cam 1 so that cam 1 will be displaced angularly the amount $(A+B)$ and also add B to angle ($\theta_1$) on cams 25 and 57 so that each of these cams will be angularly displaced the amount $(B_1)$. In the operation of the director thus far to solve Equation 9 all known quantities have been introduced on both sides of the equation and there remains but the solution of one unknown $(G_1)$ to solve the equation. It will be recalled that the needle on the $G_1$ indicator 82 was, in the orientation of the director, displaced from its normal or zero displacement setting an amount equal to or proportional to colog $$\frac{BG_1}{BA}$$

and that the objective is to make the algebraic sum of the lifts of the cams that rotate in values of the angles of the members of the left side of Equation 9, viz., cams 1, 4, 25 and 28 equal the right side of this equation which is determined when the lifts of the cams cause the needle to return to its normal. Now cam 1 has been displaced through the angle $(A+B)$ so its follower 13 will have lifted an amount equal to or proportional to the log sin of this value, similarly cam 4 has been displaced through angle A and its follower lifted an amount equal to or proportional to colog sin A. The median portion of cross arm or lever 14 interconnecting followers 13 and 15 will have been raised a distance equal to the mean lifts of followers 13 and 15 or $$\frac{\log \sin (A+B) + \colog \sin A}{2}$$

and likewise the end of bar 79 operably engaging this part of lever 14 will have been lifted the same distance which will have lifted the median part of bar 79 and cooperating arm of lever 80 one-half of this distance or $$\frac{\log \sin A + B + \colog \sin A}{4}$$

Since, however, the arm of lever 80 that engages the plunger 195 of indicator 82 is substantially four times as long as the arm that engages bar 79 the lift impressed on indicator 82 will be substantially four times the lift of the median portion of bar 79 or log sin $(A+B)$ +colog sin $A$, and of reversed sign whereby the needle of indicator 82 will be returned toward its normal zero displacement setting from its original displacement in orientation by this value. Also since cam 25 has been angularly displaced through the angle $B_1$ its lift which will be colog sin $B_1$ at this time will have been impressed on indicator 82 through the follower 49, and levers 50, 79 and 80 to have returned the needle of indicator 82 back toward its normal by this amount in addition to the amount log sin $(A+B)$ +colog sin $A$. To complete Equation 9 it is now necessary to introduce the colog sin $G_1$+log sin $G_1$ on the left side of the equation which will be indicated by return of the needle of indicator 82 to its normal position from its instant position. This latter operation may be performed by rotating cams 25 and 28 which have, respectively, lifts equal to or proportional to the colog sin $(G_1+B_1)$ and log sin $G_1$ until their lifts return the needle of indicator 82 to its normal. Cams 28 and 25 are rotated by handwheel 32, shaft 31, worm 33, differential 34 and worm 35 to a position where the lifts of followers 49 and 51 through levers 50, 79 and 80 will completely return the needle of indicator 82 to normal in which position cam 28 will have been rotated through the angle $G_1$ and cam 25 through the angle $(G_1+B_1)$ as all other cams involved in Equation 9 have been rotated through known values. The members of Equation 9 have now been fully equated and the value of angle $G_1$ may be read directly from the counter V associated with shaft 31 which gives the direction of target T from directing point $G_1$.

The solution of Equation 15 is performed by the director in a manner generally similar to the manner in which it solves Equation 9. In Equation 15 there are initially two unknowns, however, namely: $G_1$ and $R_1$ and, therefore, the solution of this equation depends upon the solution of Equation 9 as the determination of $R_1$ is contingent on the determination of $G_1$.

In the orientation of the director it will be recalled that the needle of the $R_1$ indicator 73 was displaced an amount equal to or proportional to the right side of Equation 15 or log BA and as in the solution of Equation 9 the objective is to equate this value through the lifts of the cams which are rotated through the angles or terms occurring on the left side of Equation 15. As the left side of Equation 15 includes three of the same terms that are used in Equation 9, i. e., log sin $(A + B)$, colog sin A, and log sin $G_1$ use is made of cams 1, 4 and 28 respectively, in solving Equation 15 and as cams 1, 4 and 28 have been angularly displaced properly in the solution of Equation 9 the lifts of their followers may be directly employed in the solution of Equation 15. Followers 13 and 15 of cams 1 and 4, respectively, will lift the medial portion of lever 14 the mean of their individual lifts or $$\frac{\log \sin (A+B) + \colog \sin A}{2}$$

and lever 14 will by means of the fulcrum 75 and arm 74 rotate the rocker bar 76 about its longitudinal axis to transmit substantially twice this lift, or log sin $(A + B)$ + colog sin $A$, to the free ends of arms 77 and 122 and thereby raise the slide 79 and engaged end of lever 69 the same amount. The medial portion of lever 69 will be raised one-half the distance of its end engaging slide 78 or $$\frac{\log \sin (A+B) + \colog \sin A}{2}$$

and will in turn lift the medial portion of bar 70 and end of the arm of lever 71 engaged therewith one-half the latter value or $$\frac{\log \sin (A+B) + \colog \sin A}{4}$$

Since the length of the arm of lever 71 which engages the plunger 195 of indicator 73 is substantially four times the length of the arm engaging lever 70 the lift transmitted to the latter arm will be multiplied four times and be of opposite sign, hence the end of lever 71 engaging the plunger 195 will cause the needle of indicator 73 to be returned back toward normal from its displacement caused by orientation an amount equal to the lifts of cams 1 and 4 or log $(A + B)$ + colog sin $A$.

Cam 28 was positioned in the proper angular value in the solution of Equation 9 and as its lift is log sin $G_1$ its follower 51 will, through the levers 67, 70, 71 transmit the value of this lift to indicator 73, with opposite sign, to move the needle toward its zero or normal displacement setting from its instant position by this amount.

Cam 57 was also positioned in the angular value of $B_1$ by the introduction of the $G_1$ offset angle $(\theta_1)$ and angle B as hereinbefore explained and its lift is in terms of colog sin $B_1$ which will be transmitted to the indicator 73 through follower 68 and levers 69, 70, 71, similar to the manner in which the lift of follower 51 is transmitted to return the needle of the indicator back to normal by this amount or colog sin B.

All terms of the left side of Equation 15 have now been introduced in the director except the log $R_1$ and this value is introduced to complete the equation by rotating handwheel 58 which through shaft 59, gearing 60, shaft 61 and worm 62 will rotate cam 65. The cam 65 will be rotated to a position where its lift in terms of log R₁, through the follower 66, and levers 67, 70 and 71 will restore the needle of the R₁ indicator 73 to its normal or zero displacement position in which position this cam will indicate the range R₁ and may be directly read from the counter V associated with the shaft 59.

If it is desired to determine the direction G₂ of the target T from a second directing point G₂ cams 1, 4, 83 and 86, will be positioned by their associated mechanism to solve Equation 9' in a manner similar to the one in which cams 1, 4, 25 and 28 were positioned to solve Equation 9. Likewise if it is desired to determine the range R₂ from directing point G₂ to the target T Equation 15' may be solved by cams 1, 4, 86, 102 and 110 and their associated mechanism in a manner similar to the one in which cams 1, 4, 28, 57 and 65 were positioned to solve Equation 15.

If it is desired to have the angles A, B, G₁ and G₂ read true azimuths it is only necessary to set the azimuth of the base line AB into the instrument by setting the counters V associated with shafts 7, and 18 to the azimuth or back azimuth of the base line AB as the case may require and to set the counters V associated with shafts 31 and 89 on the azimuth or back azimuth of the lines BG₁ or BG₂ as the case may require during the orientation of the director, after which in operation of the director these angles will read as true azimuths.

METHOD II.—*Single station*

This method of operation of the director is employed where it is desired to find the range R₁ and direction G₁ of a target from a known point from which the target is not visible, such as point G₁, when the range R₂ and direction G₂ from another known point from which the target is visible, as for example point G₂, may be ascertained, and under conditions where a base line AB is not, or cannot be established, or when the base end stations A and/or B of an established base line AB are not capable of functioning. It being understood that points G₁ and G₂, as shown in Fig. 2, may be any two suitable known points.

The first step in the determination of R₁ and G₁ lies in the orientation of the director and this step is very similar to the corresponding step outlined in the operation of Method I; i. e., the length of the base line AB and ratios $$\frac{BG_1}{BA}, \frac{BG_2}{BA}$$

are set upon the indicators (73, 127) and (82, 117) respectively, to displace the needles of the indicators correspondingly. Likewise if G₁ and G₂ offset angles ($\theta_1$) and ($\theta_2$) exist they are set in the director through handwheels 128 and 130, respectively, to angularly displace cams 25, 56, 83 and 102 as set forth under Method I. In the situation where a base line AB has been established and one or both of the base end stations A and B are out of action, the length of such established base line AB and corresponding ratios $$\frac{BG_1}{BA}, \frac{BG_2}{BA}$$

along with the offset angles ($\theta_1$) and ($\theta_2$) may be used for the purposes of orientation; but in the situation where a base line AB is not established it is of course obvious that a fictitious base line AB must be assumed. Although the base line AB may be assumed to be of any length and to extend in any direction relative to the points G₁ and G₂ it is convenient to assume that the base line passes through both points G₁ and G₂ whereby there will be no offset angles ($\theta_1$) and ($\theta_2$) and the ratios $$\frac{BG_1}{BA}, \frac{BG_2}{BA}$$

may be made any desired value; or to assume that the base line AB coincides with BG₁ or BG₂ so that there is but one offset angle ($\theta_1$) or ($\theta_2$) as the case may be. In the latter assumption the ratios $$\frac{BG_1}{BA}, \frac{BG_2}{BA}$$

may be made unity whereby $BG_1 = AB = BG_2$ and the triangle G₁BG₂ is isosceles.

For the purpose of illustrating the instant method of operation it will be assumed that base line AB is not established on the terrain and that a fictitious base line AB is assumed to coincide with the line BG₂, shown in Fig. 2, with the ratios $$\frac{BG_1}{BA} \text{ and } \frac{BG_2}{BA}$$

equal to unity and but one offset angle ($\theta_1$), accordingly, the director will be oriented with this data and when so oriented is in condition to determine R₁ and G₁ from the known data R₂ and G₂.

Having displaced the needles of the G₁ indicator 82 and G₂ indicator 117 an amount equal to or proportional to the colog $$\frac{BG_1}{BA} \text{ and } \frac{BG_2}{BA}$$

respectively, which amounts are equal to the members of the right sides of Equations 9 and 9' respectively; and having displaced the needles of the R₁ indicator 73 and R₂ indicator 127 an amount equal to or proportional to the log BA, which amount is equal to the term occurring on the right side of either Equation 15 or 15', in a manner as set forth under the operation by Method I, it is now the objective to solve Equations 9, 9', 15 and 15' by causing the algebraic sum of the lifts of cams 1, 4, 25, 28, 57, 65, 83, 86, 102, 110 to bring the needles of indicators 73, 82, 117 and 127 back to their normal positions of zero displacement for the purpose of determining the required data R₁ and G₁. It will be understood that Equations 9, 9', 15 and 15' are interdependent and that their solution must be simultaneous in this method of operation and that the required data will only be correct when all indicators 73, 82, 117 and 127 have their needles at normal position of zero displacement.

In the orientation of the director the offset angle ($\theta_1$), which is the only offset angle under the assumption made, was introduced in the director through handwheel 128, and impressed on cams 25 and 56 as heretofore described. The range R₂, a known factor, is now introduced through handwheel 103 and impressed upon cam 110, likewise G₂, a known factor, is impressed upon cams 86 and 83 by handwheel 90. Equations 9, 9', 15 and 15' are now simultaneously solved by rotating the handwheel 17 until the needle of the R₂ indicator 127 is returned to its normal, rotating the handwheel 8 until the needle of the G₂ indicator 117 is returned to its normal, rotating the handwheel 32 until the needle of the $G_1$ indicator 82 is returned to its normal, and rotating the handwheel 58 until the needle of the $R_1$ indicator 73 is returned to its normal.

In the solution of the Equation 15′ it will be observed that the cam system governing the movement of the needle of the $R_2$ indicator 127 comprises cams 1, 4, 86, 102 and 110 which rotate in the values indicated thereon in Fig. 4 and which have lifts of log sin $(A + B)$, colog sin $A$, log sin $G_2$, colog sin $B_2$ and log $R_2$, respectively; of these cams the cams, 86 and 110 have been angularly displaced through the known values $G_2$ and $R_2$, respectively, cams 1 and 4 will be positioned to correspond to angle $A$ (which in the particular assumption made is equal to angle $G_2$) in bringing the needle of the $G_2$ indicator 117 back to its normal in the solution of equation 9′, and it only remains to so position the cams 1, and 102 that the needle of the $R_2$ indicator 127 is returned to its position of zero displacement to solve Equation 15′ and thereby determine angle $B$ which is equal to angle $B_2$ under the present assumption, as offset angle $(\theta_2)$ is zero. By rotating cams 1, and 102 until the algebraic sum of the lifts of the cams 1, 4, 86, 102 and 110 is equal to the right side of Equation 15′ or log BA cam 102 will be positioned in the angle $B_2$, which equals angle $B$, since cams 1, 4, 86 and 110 have been positioned in either known or determined values and the value of angle $B$ may be read from the counter V associated with shaft 18. As clearly shown in Fig. 4 the lifts of cams 1, 4, 86, 102 and 110 will be transmitted by the followers 13, 15, 112, 118, 119, respectively, and the bars 14, 74, 122, 120, 123 and 124 to the short arm of lever 125 and through the long arm of the latter to the plunger 195 of $R_2$ indicator 127 (in opposed sign) to return the needle of the indicator from its displacement through orientation to its normal position of zero displacement.

The cam system controlling the $G_2$ indicator 117 comprises cams 1, 4, 83 and 86 which function to solve Equation 9′. Of the cams in this system cams 86 and 83 have been positioned in the angle $G_2$ through handwheel 90 and associated shafting and gears, cam 1 has been positioned in the angle $B$ and the latter angle (which is equal to angle $B_2$) has been added to angle $G_2$ on cam 83 in the solution of Equation 15′. With cams 86 and 83 properly positioned and cam 1 positioned in angle $B$ it is only necessary to turn cams 1 and 4 through handwheel 8, shaft 7, differential 9, shaft 7a, worm 10, differential 11 and worm 12 until their lifts combined with the lifts of cams 86 and 83 is sufficient to return the needle of the $G_2$ indicator 117 to normal at which time the cam 4 is positioned in angle $A$ and Equation 9′ is solved. The angle $A$ may be read from the counter V associated with shaft 7 and under the particular assumption made is equal to the known angle $G_2$. The lifts of cams 1, 4, 83 and 86 is transmitted to $G_2$ indicator 117 by the followers and bars associated therewith as indicated in the description of the operation under Method I.

Equation 9 is solved by the cam system including cams 1, 4, 25 and 28 to determine $G_1$ of the required data. Cams 1 and 4 have been positioned in the values of $A$ and $(A + B)$, respectively, and cam 25 has been positioned in the angle $B_1$ (offset angle $(\theta_1)$ and angle $B$) during the orientation of the director and solution of Equations 15′ and 9′ as above explained. Cam 28 is rotated and cam 25 further rotated through handwheel 32 until the combined lifts of cams 1, 4, 25 and 28 are equal to the displacement of the needle of $G_1$ indicator 82 which is determined when the needle is returned to its normal position at which time the cam 28 will be positioned in the value of $G_1$ which may be read directly from counter V associated with shaft 31. The lifts of cams 1, 4, 25 and 28 are transmitted to $G_1$ indicator through their followers 13, 15, 49 and 51 and associated levers as hereinbefore explained.

Cams 1, 4, 28, 57 and 65 constitute the cam system employed in solving Equation 15 for $R_1$ of the required data and in this system cams 1, 4, 28 and 57 have been properly positioned during the orientation and solution of Equations 15′, 9′ and 9, therefore, it is only necessary to make the algebraic sum of the lifts of all the cams of this system equal the displacement of the needle of $R_1$ indicator 73 and this may be done, in as much as all cams except cam 65 are properly positioned, by rotating the handwheel 58 to turn cam 65 until the needle of the $R_1$ indicator 73 is returned to its normal position of zero displacement at which time the value of $R_1$ may be read from the counter V associated with shaft 59. The lifts of cams 1, 4, 28, 57 and 65 are transmitted by their cooperating followers 13, 15, 51, 68 and 66, respectively, and associated bars in the manner as described under the operation of Method I and in a manner similar to the one in which the lifts of the cams used in solving Equation 15′ are transmitted to the $R_2$ indicator 127.

In the instant method of operation, azimuth may be used instead of angles by using the expedient disclosed in the description of the operation under Method I.

METHOD III.—*Airplane control*

In employing the director to operate by this method the following data will be furnished initially by the airplane observer: course of the target, speed of the target, range $R_1$ of the target and direction $G_1$ of the target from the directing point $G_1$. In addition to the above furnished data the following is known: length of the base line AB, line $BG_1$ and $G_1$ offset angle $(\theta_1)$. With the data available the director is operated to continuously compute the present range $R_1$ and direction $G_1$ of target T as it progresses on its course by solving Equations 9, 9′, 15 and 15′.

As in the other methods of operation heretofore explained the director is first oriented, i. e., the $R_1$ and $R_2$ indicators 73 and 127, respectively, are set to the base line length BA, the ratio $$\frac{BG_1}{BA}$$

is set on the $G_1$ indicator 82, and the $G_1$ offset angle $(\theta_1)$ is set into the director by handwheel 128 all as hereinbefore described in connection with the prior methods of orientation. When operating the director by this method, solution of Equations 9, 9′, 15 and 15′ is facilitated if the range $R_2$, that is, distance $G_2T$, Fig. 2, is made to vary by a rate equal to the speed of the target and angle $G_2$ is assumed as a known value; for under these conditions the director may compute the initial range $R_2$, the ratio $$\frac{BG_2}{BA}$$

and angles $A$, $B$; the speed of the target may be used as the range rate of change of range $R_2$ in the director, and the $G_2$ offset angle ($\theta_2$) is known. Conveniently station $G_2$ is assumed to lie on the course of the target at such point that angle $G_2$ is equal to 90° which makes the triangle $BG_2T$ a right triangle, the azimuth of line $BG_2$ known, and the $G_2$ offset angle ($\theta_2$) determinable from the known azimuth of the base line AB and course of the target T. Orientation is effected in accordance with the assumption made by setting the $G_2$ offset angle ($\theta_2$) in the director by handwheel 130, setting the $G_2$ angle at 90° by handwheel 90 and associated counter V, the speed of the target on the variable speed mechanism 147 by handwheel 148 and the associated range rate dial, the initial azimuth of the target T from station $G_1$, or $G_1$ angle, by handwheel 32 and associated counter V and initial range $R_1$ of the target T from station $G_1$ by handwheel 58 and its associated counter V. The specified data having been set in the director there remains to be determined four unknowns to complete orientation with respect to the reported position of the target, viz., A, B, $R_2$, $$\frac{BG_2}{BA}$$

and these unknowns are solved by the director through solution of the four Equations 9, 9′, 15 and 15′. Equations 9 and 15 are simultaneously solved to determine A and B from which latter data Equations 9′ and 15′ may be solved for $$\frac{BG_2}{BA}$$

and $R_2$ respectively.

From the prior description it will be recalled that Equation 9 is dependent for its solution on the cam system comprised of cams 1, 4, 25, and 28 while Equation 15 is dependent upon the cam system comprised of cams 1, 4, 28, 57 and 65 and that the algebraic lifts of these cams must be such as to return the needles of indicators 82 and 73 to their positions of normal zero displacement. Of the cams in the cam system of equation 9, cam 28 has been positioned in the angular value of $G_1$ and cam 25 has been positioned in the algebraic angular values of $G_1$ and ($\theta_1$) as above stated. Cams 1 and 4 will be properly positioned in the value of angle A in the solution of equation 15 and by rotating handwheel 17 in the value of angle B until the needle of the $G_1$ indicator 82 is returned to its position of normal zero displacement and the proper value of angle B will be impressed on cams 1 and 25, to algebraically add to the values already impressed upon these cams so that they will have been rotated, respectively, the angular value $(A+B)$ and $(G_1+(\theta_1)+B)$ or $(G_1+B_1)$.

In the cam system controlling the solution of Equation 15 cams 1 and 57 have been positioned in the angular value of angle B during the solution of Equation 9, cam 57 having previously had the $G_1$ offset ($\theta_1$) impressed thereon will be properly positioned in the value of $B_1$ and cam 65 has been properly positioned in the value of $R_1$ as above set forth. Cams 1 and 4 are now varied in the value of angle A through handwheel 8 until the needle of the $R_1$ indicator 73 is returned to its normal position of zero displacement at which time the terms of Equation 15 are properly equated and angle A is solved.

Equation 15′ governed by the cam system comprised of cams 1, 4, 86, 102 and 110, may next be solved for the initial value of $R_2$. Cams 1, 4, 86 and 102 have all been properly positioned either by data known or solved in the solution of Equations 9 and 15 and cam 110 is so positioned that its lift added to the lifts of cams 1, 4, 86 and 102 will return the needle of the $R_2$ indicator 127 to its position of zero displacement in which position cam 110 will have a lift equal to or proportional to the initial range $R_2$.

The cams of the system comprised of cams 1, 4, 83 and 86 used in the solution of Equation 9′ have been properly positioned by known data and in the solution of Equations 9 and 15, consequently since the algebraic lift of these cams, when properly positioned, would cause the needle of the $G_2$ indicator 117 to lie in its position of zero displacement, the value $$\frac{BG_2}{BA}$$

may be set into the director by setting the needle of the $G_2$ indicator 117 at its normal position of zero displacement through the knob 183 associated with the indicator.

The manner in which the lifts of the cams are transmitted to the various indicators by means of the associated followers and levers is believed to be obvious from the operation thereof as set forth under the operation of the director by Method I and will not, therefore, be repeated here.

The director is now oriented and ready for operation, but it is to be observed that the director need not be used to solve all of the data required in orientation as above for in some cases certain or all of the data $$\frac{BG_2}{BA}$$

$R_2$, A and/or B may be known when the target is positioned as reported by the airplane observer which would modify the procedure of orientation accordingly. For example, if the quantities $$\frac{BG_2}{BA}$$

and $R_2$ are introduced into the director as determined values then orientation of the director is completed by bringing the needle of the $R_2$ indicator 127 to its position of normal zero displacement by the handwheel 17 which controls the cams that rotate in values of angle B and the needle of the $G_2$ indicator 117 is brought to its position of normal zero displacement by handwheel 8 which controls the cams that rotate in values of angle A to solve Equations 9′ and 15′ for angles A and B. In like manner the director may be used to solve any of the required data $$\frac{BG_2}{BA}$$

$R_2$, A, B where a portion thereof is introduced into the director as a determined value.

In operation, after the director has been oriented, the range rate clutch is thrown into operation to connect the output element of the variable speed mechanism 147 and shaft 150 through gearing 151 with shaft 104 to drive the $R_2$ cam 110 through gearing 105, shaft 106 and worm 107 at a rate equal to the speed of the target. From an inspection of Fig. 2 and Equations 9′ and 15′ it will be seen that as the value of $R_2$ changes the values of angles A and B correspondingly change, therefore, as cam 110 is rotated by the range rate mechanism 147, the needles of the $G_2$ indicator 117 and $R_2$ indicator 127 are kept at their positions of normal zero displacement by handwheels 8 and 17, respectively, to keep the corresponding values of angles A and B set upon the cams that rotate in these values and the right and left sides of Equations 9' and 15', respectively, properly equated.

Changing angles A and B in Equations 9' and 15' to correspond with the change of the value $R_2$ in Equation 15' will also change the value of angles A and B in Equations 9 and 15 accordingly, as hereinbefore set forth, and as the values of $G_1$ and $R_1$ change with A and B these latter values may be determined by keeping the needles of the $G_1$ indicator 82 and $R_1$ indicator 73 at their positions of normal zero displacement through the $G_1$ handwheel 32 and $R_1$ handwheel 58, respectively, to properly position the cams that rotate in these values and Equations 9 and 15 balanced.

The desired data $G_1$ and $R_1$ may be read directly from the counters V associated with handwheels 32 and 58 respectively.

METHOD IV.—*Combination method (using both angular travel and linear speed)*

When conditions are such that it is desirable to determine the course and linear speed of a target, this director may be employed to develop the linear speed and course of the target from observations based on the angular travel of the target, and after the development of the course and speed, employed to compute gun data from a point, as $G_1$, by either one of two methods more fully hereinafter referred to.

As in Method I the length of a base line, such as AB Fig. 2, will be known, the base line angles A and B may be, at least initially, observed and point $G_1$ will be off the base line AB but relatively located with respect thereto so that the $G_1$ offset angle $(\theta_1)$ and relation $$\frac{BG_1}{BA}$$

are known. As in Method III the $G_2$ point will be assumed to lie on the course of the target with angle $G_2$ equal to 90° whereby the computation of the linear speed of a target T and its course, or $G_2$ offset angle $(\theta_2)$ will be facilitated. In this case, however, the course of the target and its linear speed are unknown and must be developed.

With the known data $(\theta_1)$, base line length AB and ratio $$\frac{BG_1}{BA}$$

the director is oriented as described under Method I. For reasons hereafter more clearly disclosed it is unnecessary to determine the ratio $$\frac{BG_2}{BA}$$

as a tangible value since the director is used in such manner that this value is automatically introduced therein.

In operation Equations 9, 9', 15 and 15' are solved to determine the required data. Angles A and B are set in the director continuously by handwheels 8 and 16, respectively, and the counters V associated with the handwheels. Equation 9 is solved by the system of cams 1, 4, 25 and 28, of these cams, the cams 1, 4 and 25 will have been angularly displaced in accordance with the known values $(A+B)$, A and $(B+\theta_1)$ or $B_1$, respectively, so that it only remains to position the cams 25 and 28 in the value of $G_1$ by the handwheel 32, which is determined when the needle of the $G_1$ indicator 82 is returned to its position of normal zero displacement. It will be recalled that in orientation the needle of $G_1$ indicator 82 was displaced an amount $$\frac{BG_1}{BA}$$

and that when this value is reduced to zero by the lifts of the cams 1, 4, 25 and 28 that Equation 9 is balanced. Since cams 1, 4 and 25 are displaced known values it is obvious from Equation 9 and the cam system that the remaining lift required of cams 25 and 28 will be in terms of $G_1$ and that the value indicated by counter V associated with shaft 31 will be the required value of angle $G_1$ when cams 25 and 28 are so positioned as to complete return of the needle of $G_1$ indicator to zero displacement.

Equation 15 is next solved by cams 1, 4, 28, 57 and 65. Through known data and the solution of Equation 9 all members of Equation 15 are known except $R_1$. The needle of the $R_1$ indicator 73 was displaced in the log BA in orientation and cams 1, 4, 28 and 57 have been properly positioned in the values through which they rotate by introduction of angles, A, B, $(\theta_1)$ in the director and solution of Equation 9 for angle $G_1$. Hand-wheel 58 is now rotated to so position cam 65 that its lift added to the lift of cams 1, 4, 28 and 57 will be sufficient to restore the needle of $R_1$ indicator 73 to its normal zero displacement setting at which time cam 65 will be positioned in the value of $R_1$ and equation 15 balanced. The value of $R_1$ may be read directly from the counter V associated with shaft 59.

In orientation the $G_2$ offset angle $(\theta_2)$ was set on cams 83 and 102 by handwheel 130 at 90° to expedite the determination of the target's course, therefore, this element of data is known and equation 15' through cams 1, 4, 86, 102 and 110 may be balanced. Cams 1, 4, 86 and 102 are in proper angular position because of the introduction of the data A, B, $G_2$, and $(\theta_2)$ in the director, and their combined lifts have returned the needle of the $R_2$ indicator 127 from its position of displacement from normal (log AB) back to normal position of zero displacement all except the amount log $R_2$. Cam 110 which rotates in the value log $R_2$ is therefore, rotated by handwheel 148 until the lift thereof added to the lifts of cams 1, 4, 86 and 102 is sufficient to complete restoration of the indicator needle to its normal zero position in which position the value of $R_2$ will be indicated by the counter V associated with shaft 104. In as much as the target is moving, angles A, B and $B_2$ are changing along with $R_2$ and as it is one of the objects to determine the rate of change of $R_2$ or linear speed of the target T this is accomplished by keeping the needle of the $R_2$ indicator 127 at its normal position of zero displacement through the range rate handwheel 148 and cam 110 as changes in cams 1, 4 and 102 are made due to changes in angles A and B to thereby keep equation 15' balanced. By keeping the needle of $R_2$ indicator 127 in its normal zero displacement position through handwheel 148, shaft 149, variable speed mechanism 141, shaft 150, gearing 151, 105, shaft 106, worm 107 and cam 110 a measurement of the rate of change of range $R_2$ or speed of the target along this line is obtained and may be read directly from the range rate dial associated with shaft 149.

Equation 9' is next balanced through cams 1, 4, 83 and 86. As hereinbefore pointed out the value $$\frac{BG_2}{BA}$$

was not set on the G₂ indicator 117 as this step may be eliminated in operation of the director by the instant method since its value is a constant and may be readily determined by maintaining the needle of the G₂ indicator 117 stationary at the point to which it is deflected by cams 1, 4, 83 and 86 when Equation 9' is balanced. Of the cams governing the solution of Equation 9' cam 86 is positioned in a known value cams 1 and 4 are being continuously rotated in known values and cam 83 has been displaced the known value $(G_2+B)$, however, since the value $(\theta_2)$ has not as yet been introduced in the director Equation 9' is not balanced and changes in angles A and B as introduced will cause movement of the needle of the G₂ indicator 117, consequently, to balance Equation 9' handwheel 130, which impresses G₂ offset angle $(\theta_2)$ on cams 83 and 102 is rotated to make the needle of the G₂ indicator 117 remain stationary as angles A and B change which properly positions cam 83 by adding the value $(\theta_2)$ to $(G_2+B)$ to position the cam in the value $(G_2+B_2)$. Angle $(\theta_2)$ may be read from the counter V associated with shaft 131 from which the course of the target will be known from any given point. For example if the course is referred to the base line AB by counterclockwise angle it is only necessary to substract 90° from angle $(\theta_2)$ to know the course which may be done on the counter $(\theta_2)$ coacting with shaft 130 by adjusting the counter to read the course of the target from the given datum point when angle $(\theta_2)$ is set.

With the course and speed of the target developed the director can continue to compute the required data G₁ and R₁ by the base line angles A and B as above outlined, so long as angles A and B may be observed, but if one or both base end stations A and B should go out of action for any reason, such as smoke, haze or communication breakdowns the director can continue to compute G₁ and R₁, by operation under Method III, based on the developed course and speed of the target, as determined by the director, at the time the base end station or stations A and B go out of action.

*Range and direction predicting mechanism*

In the description of the operation of the director thus far the required data, such as R₁, G₁ or R₂, G₂ has been in terms of the present position of the target, but this data in itself forms only a basis for the required gun data in final form, in as much as it must have algebraically combined therewith the change in range and direction of the target during the time of flight of the projectile from the gun position to the target. The present director is designed to compute or predict the changes in range and direction of the target relative to a given gun position during the time of flight based on the behavior of the target during an observed interval, usually amounting to only a fractional part of the time of flight, and algebraically combine the predicted changes with the range and direction of the present position of the target to give the range and direction to the future position of the target.

Irrespective of the method of operation of the director, i. e., Methods I, II, III or IV the ranges R₁ or R₂ and directions G₁ or G₂ are continuously computed, therefore, advantage is taken of this fact to determine the changes in range and direction of the target during a predetermined interval of time on which to base predictions, and for the purpose of this disclosure the description will be confined to the operation of the predicting mechanism for R₁ and G₁, as shown in Fig. 3, although it will be understood that similar mechanism functioning in similar manner may be used to predict changes in range R₂ and direction G₂ through mere duplication of the apparatus used for predicting changes in range R₁ and direction G₁.

The rounds or revolution counter C in back of range prediction disk 156 is rotated by the shaft 136, gearing 135, shaft 59, and R₁ handwheel 58 and when armed is adapted to displace the needle of the range prediction indicator accordingly and similarly the rounds or revolution counter C in back of azimuth prediction indicator disk 157 is rotated by shaft 41, gearing 40, shaft 39, gearing 38, shaft 31 and G₁ handwheel 32 and when armed also will correspondingly displace the needle of the azimuth prediction indicator. Now if the rounds counters are armed for a specified interval of time the displacement of the needles of indicators 156 and 157 will be a measure of the change in range and direction, respectively, during said interval of time.

For the purpose of arming the rounds counters during a predetermined interval of time, unarming, and resetting the same, the time interval device 145, solenoid 154, and electric power source 152 in circuit 153 are provided to actuate arming, unarming and resetting linkages similar to those shown in Fig. 12.

The threaded shaft 226 of the time interval device 145 is driven by the constant speed motor 146 through gearing 227 to provide means for advancing the slidably mounted sleeves 233—233 toward plate 229 of the rocking frame at a constant uniform rate. The blocks 223—223 are moved from their normal zero positions adjacent upper plate 216 toward lower plate 217 by the threaded shafts 221 an amount proportional to the time of flight and the dwell period, respectively, through gearing 144, shaft 142 and handwheel 143 and independently actuable shaft 142' to position the inclined faces 224 of the blocks in the path of movement of the fingers 237 carried by sleeves 233, so that the pins will engage the inclined faces 224, as they are alternatively advanced, to swing or oscillate the rocking frame from side to side after the lapse of intervals of time proportional to the time of flight and dwell period. For the purpose of illustration, let it be assumed that the time of flight is such that the rightmost block 223 as viewed in Fig. 7 is positioned at a medial point on threaded shaft 221 corresponding to time of flight and the leftmost block 223 positioned for a two second dwell period, and that the rocking frame is displaced in such manner that the rightmost sleeve 233, as viewed in Fig. 7, is in threaded engagement with shaft 226. Upon energization of the motor 146 the shaft 226 will advance the noted sleeve 233 toward plate 229 at a uniform rate until the finger 237 thereof engages face 224 of the adjacent block 223 whereupon the finger will be cammed to the right to swing the rocking frame in the same direction until the sleeve is disengaged from threaded shaft 226 at which time the associated spring 235 will return the sleeve to its normal position adjacent plate 228. When the noted sleeve is disengaged from shaft 226 by reason of swinging the rocking frame the other sleeve 233 will be engaged with shaft 226 and will pass through the same cycle described with reference to the noted sleeve except it will swing the rocking frame to the left. The sleeves 233 will continue to oscillate the rocking frame as long as motor 146 is energized through repetition of the above described cycles and while the rocking frame is in its right hand position the circuit 153 is energized through any well known make and break device S to in turn energize the solenoid 154. When the rocking frame is swung from its right to its left position the circuit 153 is de-energized and this period of de-energization or dwell period may be made to occur for any suitable period through adjustment of the leftmost block 223 by means of its associated gear 144 and shaft 142'. In the present director the time interval device is usually adjusted to have a dwell period of about two seconds.

In operation of the range drum 134 which carries the required family of curves to show relation between range and time of flight, is positioned in range by shaft 140, differential 139, shaft 138, gearing 137, shaft 136, gearing 135, shaft 59 and $R_1$ range handwheel 58. The time pointer 141 is adjusted by handwheel 143 until its index lies on the proper time of flight curve, which operation, through shaft 142 and gearing 144 will position the time of flight block 223 of the time interval device 145 below its position of normal zero displacement an amount proportional to the time of flight. The rocking frame of the time interval device, which will be displaced to its right position, will complete circuit 153 to energize solenoid 154 and when in its right position the latter will arm the rounds counters in back of the range prediction disk 156 and azimuth prediction disk 157 through the linkages of Fig. 12 as above outlined. As handwheels 58 and 32 are rotated to keep the instantaneous or present range $R_1$ and direction $G_1$ of the target in the director such rotation will be transmitted to the rounds counters in back of indicator disks 156 and 157 and as the counters are armed they will also rotate to displace the needles of the indicators during the period they remain armed which exists as long as the solenoid 154 is energized. The solenoid 154 will remain energized until rightmost pin 237, as viewed in Fig. 7, or the time of flight pin has been advanced to a point by its sleeve 233 where it will engage the inclined face 224 of the cooperating block 223 to be cammed to the left side to swing the rocking frame accordingly, as above described, at which time circuit 153 is opened for the dwell period and the counters are unarmed with the indicator needles of the prediction indicator displaced to a position on the indicator dials corresponding to the prediction. During the period that the counters are armed they register changes in $R_1$ and $G_1$ as indicated by the needles that move over the dials of indicators 156 and 157, respectively, and at the expiration of the period of time of flight, or fractional portion thereof used, register the total changes in $R_1$ and $G_1$ for this period to constitute the basis of the prediction. The changes in $R_1$ and $G_1$ indicated on the range prediction indicator and azimuth prediction indicator are added to the present range $R_1$ and present azimuth $G_1$, respectively to give the range and azimuth of the predicted position of the target at the time a projectile will reach that position. The range prediction is added, by means of handwheel 158, shaft 159, gearing 160, shaft 161, differential 139, shaft 140, shaft 168 and differential 169 to the range $R_1$ as transmitted to the range or elevation transmitter 170 by shaft 136, gearing 137, shaft 138, differential 139, shaft 140 and shaft 168, and is determined when the rotatable index surrounding the dial of range prediction indicator is brought into coincidence with the needle of the range prediction indicator by shaft 159. The predicted range thus computed may be transmitted to the gun position by the transmitter 170 through any suitable communication system. The quadrant elevation is computed by the director for any given range by using a straight line function of 3.03 mils for each 100 yards, and adding the difference between this line and the range elevation curve through range drum 134 to the predicted range. The range drum 134 carries appropriate elevation difference curves showing the difference between the range and quadrant elevation for any given range. Elevation difference pointer 164 has its index matched with the proper elevation difference curve on the range drum 134 through handwheel 166 and the screw shaft 165 and this difference is algebraically combined with the predicted range through differential 167 and shaft 168 so that transmitter 170 will transmit the quadrant elevation to the gun position.

To add the predicted azimuth change to the present azimuth, handwheel 162 is rotated to likewise rotate shaft 163 until the rotatable index surrounding the indicator disk 157 is brought into coincidence with the needle of the azimuth prediction indicator. Movement of shaft 163 will, through differential 46, add the predicted azimuth to the present azimuth being transmitted to the azimuth transmitter 48, through shaft 31, gearing 38, shaft 39, gearing 40, shaft 41, gearing 42, shaft 43, gearing 44 and shaft 45 to give the azimuth of the predicted future position of the target.

Upon the expiration of the dwell period of the time interval device 145 or that period during which the leftmost pin 237, as viewed in Fig. 7, is being advanced to the cam face on its coacting block 223, the solenoid 154 will again be energized to first zeroize the prediction indicator needles and then rearm the counters C in back of indicators 156, 157 by means of the structure of Fig. 12 or similar structure. The predicting mechanism is, upon re-energization of solenoid 154 and rearming of the counters conditioned for a further prediction to be made by the same operations as just described.

To reduce the length of the prediction period and increase the number of predictions that may be made for a given time of flight, the time interval device 145 is so arranged to keep the solenoid 154 and counters in back of the range and azimuth prediction devices energized and armed, respectively, for only a fractional part of the time of flight period. The prediction based on this fractional time of flight period is then multiplied by a complementary factor in any suitable manner, as by gear ratio, to give a prediction equal to one corresponding to the full time of flight. While one of the blocks 223 and its associated mechanism has been described as the time of flight block it will be understood that the blocks 223 are interchangeable in function.

If the data transmitted by the shafts 136 and 41 to the range and azimuth prediction indicators, respectively, is irregular while the counters are armed the rotatable indices surrounding the indicator disks 156 and 157, respectively, are matched with the mean throw or the needles of the prediction indicators to insert the correct range and azimuth prediction in the director.

CORRECTIONS

1. Range

Range adjustments are made as base line corrections by changing the length of the base line AB set on the $R_1$ and $R_2$ indicators 73 and 127, respectively, in terms of percent range to obtain a ballistic base line. These changes are set on the $R_1$ and $R_2$ indicators in the same manner that the base line length is set thereon, i. e., through the associated dials 181 and knobs 183.

2. Elevation

Elevation adjustments are made by changing the quadrant angle of elevation by flat angular values through the elevation spotting handwheel 177, shaft 178, differential 169 and counter V associated with shaft 178 to add or substract from the elevation being transmitted to the battery by elevation transmitter 170.

3. Muzzle velocity

Corrections in muzzle velocity may be made by the addition of muzzle velocity curves to the range drum 134. The correction specified by a muzzle velocity curve, when properly positioned, is incorporated in the quadrant elevation in a manner very similar to the one in which elevation difference for a given range is incorporated.

4. Direction

Corrections in direction may be made by using a fictitious base line or they may be made as flat angular corrections of angles A and B. Changes in angle A are effected through the spotting handwheel 171, shaft 172, gearing 173, shaft 174, differential 9 and counter V associated with shaft 174 while changes in angle B are effected through spotting handwheel 175, shaft 176, differential 19 and counter V associated with shaft 176.

5. Airplane control (a) Adjustments in speed of the target are applied through flat corrections of range $R_2$ and by changes in speed indicated by the range rate dial through a change of setting of the handwheel 148.

(b) Deviations as measured over or short of the target on a line normal to the course of the target are applied as corrections on the $G_2$ indicator 117 through the associated dial 181 and knob 183 to $$\frac{BG_2}{BA}$$

and corrections in the course of the target are made in the $G_2$ offset angle ($\theta_2$) through handwheel 130 and differential 132.

6. Ballistic corrections

Corrections of a ballistic nature are computed by means auxilliary to the director and then inserted in the director by application on the appropriate dial or counter so as to modify the affected data accordingly.

7. Arbitrary corrections

Changes of an arbitrary nature may be set in the director in terms of base line changes through use of the battery commander's correction register comprising the dials 182, 199, 204, pointer 202 and knobs 206 and 212.

The director has been so organized that corrections may be based on any standard system of spotting, such as base line spotting, single station spotting, or airplane spotting.

MISCELLANEOUS

1. Emergency orientation methods (a) Where a known datum point is available:

The observing stations A and B are so selected as to be intervisible from the ends of a base line AB of short length. Stations A and B are oriented by sighting on each other and then base line angles A and B are observed between the base line and known datum point. The angles A and B so observed are set in the director by the appropriate handwheels and the known range to the datum point is set on the range cams. Indicators 73, 82, 117 and 127 are then adjusted to read zero and this latter operation will set the length of the base line AB into the director with $$\frac{BG_1}{BA} \text{ and } \frac{BG_2}{BA}$$

equal to unity. If stations $G_1$ and $G_2$ are not chosen to coincide with station A the $G_1$ and $G_2$ offset angles ($\theta_1$) and ($\theta_2$) will be known and the ratios $$\frac{BG_1}{BA} \text{ and } \frac{BG_2}{BA}$$

may be determined as described below or in any other suitable manner.

(b) Where a known datum point is not available:

In this situation stations A, B, $G_1$ and $G_2$ are first oriented by sighting on each other. The stations then track a target in the field of fire and continuously transmit angles A, B, $G_1$ and $G_2$, respectively, to the director where such data is applied through the appropriate handwheels. The $G_1$ and $G_2$ indicators 82 and 117, respectively, are adjusted to read zero and such operation sets the base line ratios $$\frac{BG_1}{BA} \text{ and } \frac{BG_2}{BA}$$

in the director. The length of the base line AB may be determined by firing trial or ranging shots at the target on an estimated range and changing the base line length AB on indicators 73 and 127 until the center of impact is on the target. As soon as the center of impact is moved to the target the base line length AB set on indicators 73 and 127 will represent a fictitious base line of such length that ballistic conditions at the time are corrected for and the battery will be ready to enter fire for effect.

(c) Where the observing stations are not intervisible:

The observing instruments at the stations from which observations are made are paralleled by sighting on a common celestial body and the ballistic base line is determined by firing trial shots as above outlined.

(d) As will be observed from the orientation methods here set forth, the director is adapted to the ready computation of its own orientation data. This feature is of utmost importance, in the case of mobile batteries especially, where they must often go into action from traveling position without having the time to survey and compute base line data.

2. Use of the station located at point $G_2$ (a) The station at point $G_2$ may be used as a second gun position, as pointed out under the operation of the director in accordance with Method I. In this case the director computes from the present range $R_2$ and direction $G_2$ the future range and direction for a gun located at this point by predicting mechanism identical with that used for predicting the future range and direction from point $G_1$ and enables separate spotting corrections to be applied for this position. This provision of the director admirably adapts it to the situation where the guns of a major caliber battery are located at appreciably separated points or where the guns of a mobile battery are grouped into two separate units, appreciably separated, as at points $G_1$ and $G_2$, respectively.

(b) The station at point $G_2$ may be used as an observing station, in accordance with which scheme, the battery will have three observing stations A, B, $G_2$ in action instead of the usual two AB, so that in the event one station goes out of action tracking of the target from the other two will be sufficient to keep the director in continuous operation. By this method of operation change of observing stations will not cause interruption of the gun data being transmitted.

(c) The $G_2$ station may be used as the battery or fire commander's station. In which case:

(1) Data may be sent into the director as an emergency observing station; or (2) Data may be sent to the station at point $G_2$ for purposes of being checked by the battery or fire commander to determine if the observing stations AB are on the assigned target. This procedure also affords a check on the direction accuracy (present position) of the director; or (3) The battery or fire commander may place observing stations A and B on the desired target, where the field of fire contains several targets, by sending the direction and approximate range of the desired target from the station at point $G_2$ to the director. The director will compute the angles A and B for the designated target and these angles will be transmitted to the stations A and B respectively, and there set by the A and B azimuth readers on their instruments to cause the instruments to pass through the target. If the range $R_2$ cannot be accurately determined the battery or fire commander changes range $R_2$ in the director until the angles A and B, which are being continuously computed, cause the line of sight of A and B azimuth instruments to pass through the target, at which times the operators of these instruments take over tracking of the target.

(d) The station located at point $G_2$ may be used as a single observing station to determine the range $R_2$ and direction $G_2$. This data may be sent to the director which will compute therefrom the range $R_1$ and direction $G_1$ of the target from a gun position, such as $G_1$, remote from point $G_2$ by Method II of operation hereinbefore described.

(e) The point at which station $G_2$ is located may be assumed to be any desirable position, which makes it possible for the director to compute gun data based on the course and speed of the target as by Methods III and IV of operation previously described.

3. Design (a) The director is designed for two types of armament;

(1) Major caliber, long range with complete airplane control, and (2) Medium caliber, medium range with limited airplane control.

(b) The change in construction of the director required for a shift for use with one type of armament to the other consists only in a change in scale of the ratios of cams employed.

(c) The director designed for use with major caliber armament is adapted to effectively track targets up to ranges that are approximately fifteen times the length of the base line used.

(d) The director designed for use with medium caliber armament is adapted to effectively track targets up to ranges that are approximately thirty times the length of the base line used. This design of the director finds its principal use with mobile batteries, where time for getting into a position for action, length of base line that can be used and communication net are often limited.

We claim:

1. In a fire control director for solving an equation involving the first expression $$\frac{\sin A \cdot BA}{\sin (A+B)}$$

and second expression $$\frac{\sin G_{1, 2, \ldots} \cdot BG_{1, 2, \ldots}}{\sin (B_{1, 2, \ldots} + G_{1, 2, \ldots})}$$

comprising in combination first and second cams movable proportional to angles A and $(A+B)$, an indicator having relatively displaceable indices, one of said indices being displaceable in accordance with a value determined by using one other term obtained from each of said expressions, third and fourth cams movable to indicate angles $G_{1,2}, \ldots$ and $(B_{1,2}, \ldots +G_{1,2}, \ldots)$, said index being also relatively displaceable in response to the movement of each of said cams, the lifts of all of said cams being proportional to the sines of the angles of displacement of the cams; all whereby upon restoration of said index to its original position with respect to the other of said indices by operation of said cams the first and second expressions will be equated.

2. In a fire control director for mechanically solving the equation:

$$\log \sin (A+B) + \operatorname{colog} \sin A + \operatorname{colog} \sin (G_{1,2}, \ldots + B_{1,2} \ldots) + \log \sin G_{1,2}, \ldots = \operatorname{colog} \frac{BG_{1, 2, \ldots}}{BA}$$

for determining any one term of the equation where the other four terms thereof have been predetermined, in combination, an indicator, means for relatively displacing the indices of the indicator to a position corresponding to colog $$\frac{BG_{1, 2, \ldots}}{BA}$$

first, second, third, and fourth cams, said cams each being movable in proportion to angular measure, the first and fourth cams each having lifts proportional to the log sin and the second and third cams each having lifts proportional to the colog sin of the angles corresponding to their positions of movement, respectively, means for moving the first and second cams to a position corresponding to angle A, means for algebraically combining angle B with angle A and repositioning the first cam accordingly, means for moving the third cam to a position corresponding to angle $B_{1,2}, \ldots$, means for moving the fourth cam to a position corresponding to angle $G_{1,2}, \ldots$ and algebraically combining this angle with angle $B_{1,2}, \ldots$ to reposition the third cam accordingly, and means interposed between the indicator and cams operable in response to the resultant lifts of the cams to restore said indices of the indicator from a position of relative displacement corresponding to colog $$\frac{BG_{1,2,\ldots}}{BA}$$

independently of said first recited means for displacing said indices.

3. In a fire control director for mechanically solving the equation:

log sin $(A+B)$ +colog sin $A$ +colog sin $(G_{1,2}, \ldots +[B+\theta_{1,2}, \ldots]) $+log sin $G_{1,2}, \ldots =$ colog $$\frac{BG_{1,2,\ldots}}{BA}$$

for determining any one term of the equation where the other four terms thereof have been predetermined, in combination, an indicator, means for relatively displacing the indices of the indicator to a position corresponding to colog $$\frac{BG_{1,2,\ldots}}{BA}$$

first, second, third and fourth cams, said cams each being movable in proportion to angular measure, the first and fourth cams each having lifts proportional to the log sin and the second and third cams each having lifts proportional to the colog sin of the angles corresponding to their positions of movement, respectively, means for moving the first and second cams to a position corresponding to angle A, means for moving the third cam to a position corresponding to angle B and simultaneously repositioning the first cam to a position corresponding to the algebraic combination of angles A and B, means for algebraically combining the angle $\theta_{1,2}, \ldots$ with angle B and simultaneously repositioning the third cam in a position corresponding to the angle $B_{1,2}, \ldots$, means for moving the fourth cam to a position corresponding to angle $G_{1,2}, \ldots$ and algebraically combining this angle with angle $B_{1,2}, \ldots$ to reposition the third cam accordingly, and means interposed between the indicator and cams operable in response to the resultant lifts of the cams to restore said indices of the indicator from a position of relative displacement corresponding to colog $$\frac{BG_{1,2,\ldots}}{BA}$$

independently of said first recited means for displacing said indices.

4. In a fire control director for mechanically solving the equation:

log sin $(A+B)$ +colog sin $A$ +log sin $G_{1,2}, \ldots +$ colog sin $B_{1,2}, \ldots $ +log $R_{1,2}, \ldots = $log $BA$ for determining any one term of the equation where the other five terms thereof have been predetermined, in combination, an indicator, means for relatively displacing the indices of the indicator to a position corresponding to log BA, first, second, third, fourth and fifth cams, said first four cams each being movable in proportion to angular measure and the fifth cam movable in proportion to linear measure, the first and third cams each having a lift proportional to the log sin, the second and fourth cams each having a lift proportional to the colog sin and the fifth cam a lift proportional to the log of its position of movement, respectively, means for moving the first and second cams to a position corresponding to angle A, means for algebraically combining angle B with angle A and repositioning the first cam accordingly, means for moving the third, fourth and fifth cams to positions corresponding with angles $G_{1,2}, \ldots$, $B_{1,2}, \ldots$, and range $R_{1,2}, \ldots$, respectively, and means interposed between the indicator and cams operable in response to the resultant lifts of the cams to restore said indices of the indicator from a position of relative displacement corresponding to log BA independently of said first recited means for displacing said indices.

5. In a fire control director for mechanically solving the equation log sin $(A+B)$ +colog sin $A$+log sin $G_{1,2}, \ldots +$ colog sin $(B+\theta_{1,2}, \ldots) $+log $R_{1,2}, \ldots =$ log $BA$ for determining any one term of the equation where the other five terms thereof have been predetermined, in combination, an indicator, means for relatively displacing the indices of the indicator to a position corresponding to log BA, first, second, third, fourth and fifth cams, said first four cams each being movable in proportion to angular measure and the fifth cam movable in proportion to linear measure, the first and third cams each having a lift proportional to the log sin, the second and fourth cams each having a lift proportional to the colog sin and the fifth cam a lift proportional to the log of its position of movement, respectively, means for moving the first and second cams to a position corresponding to angle A, means for moving the fourth cam to a position corresponding to angle B and simultaneously repositioning the first cam to a position corresponding to the algebraic combination of angles A and B, means for moving the third and fifth cams to positions corresponding with angles $G_{1,2}, \ldots$, and range $R_{1,2}, \ldots$, respectively, means for algebraically combining angles $\theta_{1,2}, \ldots$ and B and simultaneously repositioning the fourth cam accordingly, and means interposed between the indicator and cams operable in response to the resultant lifts of the cams to restore said indices of the indicator from a position of relative displacement corresponding to log BA independently of said first recited means for displacing said indices.

6. In a fire control director for simultaneously mechanically solving the equations log sin $(A + B)$ + colog sin $A$ + colog sin $(G_{1,2},\ldots+ B_{1,2},\ldots)$ + log sin $G_{1,2},\ldots =$ colog $$\frac{BG_{1,2,\ldots}}{BA}$$

and log sin $(A + B)$ + colog sin $A$ + log sin $G_{1,2},\ldots$ + colog sin $B_{1,2},\ldots$ + log $R_{1,2},\ldots =$ log $BA$, for determining any one term of the equations where the other terms thereof have been predetermined, in combination, a pair of indicators, means for relatively displacing the indices of the indicators to positions corresponding to colog $$\frac{BG_{1,2,\ldots}}{BA}$$

and log $BA$, respectively, first, second, third, fourth, fifth and sixth cams, said first five cams being movable in proportion to angular measure and the sixth cam movable in proportion to linear measure, the cams each having lifts proportional to the log sin and log corresponding to its position of movement, respectively, means for moving the cams to positions corresponding to $(A + B)$, $A$, $(G_{1,2},\ldots+ B_{1,2},\ldots)$ $G_{1,2},\ldots, R_{1,2},\ldots$, respectively and means interposed between the indicators and cams operable in response to the resultant lifts of the cams to restore the indices from a position of relative displacement corresponding to colog $$\frac{BG_{1, 2, \ldots}}{BA}$$

and log $BA$ independently of said first recited means for displacing said indices.

7. In a data computer, in combination, an indicator of the type mounted in a casing and provided with relatively displaceable indices and a member movable relative to the casing for relatively displacing the indices thereof, means mounting the indicator casing for translating movement, means independent of said mounting means for translating the indicator casing and means engaging said member operable to restrain movement thereof upon translation of the indicator casing; whereby translation of the indicator casing will effect relative displacement of said indices.

8. In a data computer, in combination, an indicator of the type mounted in a casing and provided with relatively displaceable indices and a member movable relative to the casing for relatively displacing the indices thereof, a supporting frame, means mounting the indicator casing in the supporting frame for sliding movement therein, means independent of said mounting means operative to slide the indicator casing, and means engaging said member operable to restrain movement thereof upon sliding movement of the indicator casing; whereby movement of the indicator casing will effect relative displacement of said indices.

9. In a data computer, in combination, an indicator of the type provided with relatively displaceable indices and having a plunger depressible relative thereto for relatively displacing the indices thereof and means for restoring the plunger to its normal position from depressed position, a supporting frame, means mounting the indicator in the supporting frame for sliding movement therein, means operative to slide the indicator to and from a normal position, movable means engaging said plunger and adapted to depress the same relative to the indicator, said movable means also being operative to effect relative depression of the plunger with respect to the indicator upon movement of the indicator; whereby relative displacement of said indices may be effected by either one of said means operative to slide the indicator or to depress the plunger.

10. In a data computer, in combination, an indicator of the type provided with relatively displaceable indices and having a plunger depressible relative thereto for relatively displacing the indices thereof and means for restoring the plunger to its normal position from depressed position, a supporting frame comprising a pair of parallel spaced members formed with guideways disposed in opposed relation, a pair of guides secured to the indicator and disposed one each in said guideways for slidably mounting the indicator in the supporting frame, an interiorly threaded lug secured to the indicator, a rotatably mounted shaft having a threaded portion disposed in interthreaded relation with the lug, means for rotating the shaft to effect sliding movement of the indicator between predetermined limits, and movable means engaging said plunger and adapted to effect relative depression of the plunger with respect to the indicator between the limit of depression and normal position of the plunger.

11. In a device of the class described comprising in combination, an indicator of the type mounted in a casing and provided with relatively displaceable indices and a member movable relative to the casing for relatively displacing the indices thereof, means mounting the indicator casing for bodily movement, means independently of said mounting means for bodily moving the indicator casing, and means engaging said member operative to effect relative movement between the indicator casing and member upon bodily movement of the indicator casing.

12. In a device of the class described comprising in combination, an indicator of the type mounted in a casing and provided with relatively displaceable indices and a member movable relative to the casing for relatively displacing a pointer with respect to a graduated dial, means mounting the indicator casing for bodily movement, means independent of said mounting means for bodily moving the indicator casing provided with a dial having graduations coordinated with the graduations of said first recited dial, and means engaging said member operative to effect relative movement between the indicator casing and member upon bodily movement of the indicator casing whereby a difference in reading of said first and second dials will indicate the relative position of the member and casing.

13. In a data computer in combination, an indicator provided with relatively displaceable indices mounted for relative bodily movement with respect to a support, index actuating means movable with respect to the indicator for relatively displacing the indices of the indicator between predetermined maximum and minimum limits upon relative movement of the indicator and said means, means mounted on the support for bodily moving said indicator and means interposed between the support and indicator adapted to yield when said index actuating means or means for bodily moving the indicator are urged beyond a position corresponding to the maximum one of said predetermined limits.

14. In a data computer in combination, a support, an indicator of the type provided with relatively displaceable indices and having a member movable relative thereto adapted to relatively displace its indices to a predetermined maximum limit, means mounting the indicator in the support for sliding movement, means for bodily sliding the indicator relative to said movable member, and yieldable means interposed between the support and indicator adapted to yield to permit sliding movement of the indicator when said movable member or means for bodly sliding the indicator are urged to a position beyond the position corresponding to said maximum limit.

15. In a device of the class described comprising in combination, a support, an indicator of the type having a member movable relative thereto to displace a pointer with respect to an index between predetermined maximum and minimum limits, means mounting the indicator in the support for bodily movement, means for bodily moving the indicator relative to said member and yieldable means supporting the indicator in a normal position in the support and adapted to yield when said member or means for bodily moving the indicator are urged to a position beyond the position corresponding to the maximum one of said predetermined limits.

16. In a device of the class described comprising in combination, an indicator of the type provided with relatively displaceable indices and having a plunger depressible with respect thereto for displacing its indices from a normal coincident position to a predetermined position of maximum displacement, means mounting the indicator for bodily movement including a shaft rotatable in relation therewith to bodily move the indicator, movable means adapted to restrain movement of the plunger upon bodily movement of the indicator, a sleeve provided with a gear slidably secured to said shaft for rotating the shaft, a support for the sleeve, a yoke secured to the shaft in relative rotatable relation, and resilient means attached to the yoke and restraining it to a normal position, said resilient means being adapted to yield when the depressible plunger is urged to a position of depression beyond a position corresponding to said maximum displacement of the indices by either said movable means or means mounting the indicator for bodily movement.

17. In a data computer in combination, an indicator of the type provided with relatively displaceable indices and having a plunger depressible with respect thereto for displacing its indices from a normal coincident position to a predetermined position of maximum displacement, a pair of spaced parallel supporting members, means mounting the indicator in the supporting members for translatory movement, a shaft disposed in interthreaded relation with the indicator, means for rotating the shaft to translate the indicator including a shaft portion rigidly secured to the shaft, a sleeve provided with a gear slidingly secured on the shaft for rotating said shaft portion, a support for the sleeve, a yoke secured to the shaft portion for relative rotation therewith, and resilient means interposed between the yoke and parallel supporting members holding the yoke in a normal position but adapted to yield when said depressible plunger is urged to a position beyond its position corresponding to said maximum displacement of the indices.

18. In a data computer in combination, a battery commander's indicator comprising a graduated dial, means for moving the dial including a sleeve secured thereon, a pointer for movement over the graduations of the dial, means mounting the pointer for movement over the dial including a shaft mounted in said sleeve, an index bearing member, means mounting the index member for movement to bring its index into coincidence with the pointer including a second sleeve secured to the index member and mounted on said first recited sleeve, a graduated indicator member having graduations coordinated with the graduations of the dial, means mounting the indicator member for movement with respect to said index including a third sleeve secured to the indicator member and mounted on said second sleeve; whereby said dial and pointer may be employed to determine individual corrections and said index and indicator members to register total corrections after initial zeroizing of the indicator.

19. In a data computer in combination, a battery commander's indicator comprising a graduated circular dial, means for moving the dial including a sleeve secured thereon, a pointer for movement over the graduations of the dial, means mounting the pointer for movement over the dial including a shaft mounted in said sleeve, an annular index bearing member, means rotatably mounting the index member concentrically of the dial to bring its index into coincidence with the pointer including a second sleeve secured to the index member and mounted on said first recited sleeve, an annular graduated indicator member having graduations coordinated with the graduations of the circular dial, means mounting the indicator member concentrically of the dial and index member including a third sleeve secured to the indicator member and on said second sleeve; whereby said dial and pointer may be employed to determine individual corrections and said index and indicator member to register total corrections after initial zeroizing of the indicator.

20. In a device of the class described comprising in combination an indicator dial and indicator mechanism driven by a suitable source of power of the type having a pointer adapted to be drivingly connected to the driven indicator mechanism for intermittent intervals, disengaged therefrom to remain in its displaced position and reset to normal position in sequence, movable means effective to initiate resetting of the pointer, displaceable means effective in displaced position to drivingly connect the pointer with the driven indicator mechanism, and operating means adapted to automatically and sequentially move and release the movable means for initiating resetting of the pointer and to displace and retain in displaced position the displaceable means for a predetermined period.

21. In a data computer comprising in combination a predictor indicator dial and rounds counter of the type having a movable pointer adapted to be intermittently connected with the rounds counter for movement thereby, disengaged therefrom to remain in its displaced position and reset to its normal position in sequence, movable means effective to initiate resetting of the pointer, displaceable means effective in displaced position to drivingly connect the pointer with the rounds counter, operating means adapted to automatically and sequentially move and release the movable means for initiating resetting of the pointer and to displace and retain in displaced position the displaceable means for a predetermined period, including electro-magnetic induction means, a circuit therefor and a time interval device for connecting the circuit with a suitable energizing source for said predetermined period.

22. In a device of the class described comprising in combination an indicator dial and device driven by a suitable source of power of the type having a pointer adapted to be drivingly connected to the driven device for intermittent intervals, disengaged therefrom to remain in its displaced position and reset to normal position in sequence, a reset plunger effective to initiate resetting of the pointer, an arming plunger effective in depressed position to drivingly connect the pointer with the driven device, a pivotally mounted lever movable in one direction to engage and depress the arming plunger, a finger pivotally mounted on the lever adapted to sequentially engage, depress and release the reset plunger upon movement of the lever in said one direction and prior to arming position of the arming plunger and means for moving said lever in and contra to said one direction.

23. The structure of claim 22 wherein said finger is resiliently biased to a normal position, is formed to provide a heel engageable with to depress the reset plunger and means is provided to engage and effect rotation of the finger relative to the lever for disengaging said heel from the reset plunger upon predetermined movement of the lever in said one direction and after said reset plunger has been fully depressed.

24. The structure of claim 22 wherein said lever is a bell crank lever pivotally mounted intermediate its ends with said first named lever constituting one arm of the bell crank lever, and wherein electro-magnetic induction means is provided for actuating the free arm of the bell crank lever, a circuit therefor and a time interval device operable to connect and disconnect the circuit with a suitable circuit energizing source for predetermined periods.

25. In a fire control director in combination, means for predicting the set-forward point of a moving target comprising a shaft rotatable in present range and a shaft rotatable in present azimuth of the target, an indicator dial and rounds counter of the type wherein the pointer is adapted to be armed in driven relation with the rounds counter, unarmed therefrom in displaced position, and reset, associated with each of said shafts with the respective rounds counters in driven relation therewith, means for initiating arming, unarming, and resetting of the pointers of the indicators, index bearing members associated with each of said indicators, means for moving the index members to bring the indices thereof into coincidence with the pointers of their respective indicators, means operable to actuate said initiating means to arm, unarm, and reset the indicator pointers including a solenoid, a circuit for the solenoid, and a time interval device operable in accordance with time of flight and a predetermined dwell period adapted to connect the circuit with a suitable energizing source, future range and azimuth shafts and means for algebraically combining the movements of the present range and azimuth with the movements of the means for moving the index members, respectively upon the future range and azimuth shafts.

26. A director including cams, means for actuating the cams, a system of levers normally in balance actuated by said cams and unbalanced when some cams are actuated but again balanced by further actuation of other cams, means for indicating when a balance is established, and registers operated on actuation of the cams to register desired data.

27. A director including a system of normally balanced levers, means for introducing known data to the director and thereby unbalance the levers, means reestablishing a balance of the levers, means for indicating when a balance is established, and registers operated by said first and second named means to register desired data.

28. A director including a system of normally balanced levers, cams for moving the levers in proportion to certain data, means for actuating some of the cams to introduce known data and thereby disturb the balance of the lever system, means for moving the other of the cams or cam representing desired data to reestablish a balance, means for indicating when a balance is established, and means for registering the desired data.

JOHN T. LEWIS.
GERVAIS W. TRICHEL.